US012358276B2

(12) United States Patent
Diehm et al.

(10) Patent No.: US 12,358,276 B2
(45) Date of Patent: Jul. 15, 2025

(54) CYLINDER FOR ALIGNING MAGNETIC OR MAGNETIZABLE PARTICLES CONTAINED IN COATING AGENT ON A SUBSTRATE AND MACHINE FOR GENERATING OPTICALLY VARIABLE IMAGE ELEMENTS

(71) Applicant: KOENIG & BAUER AG, Würzburg (DE)

(72) Inventors: Tobias Diehm, Wertheim (DE); Michael Müller, Karlstadt (DE); Emmanuel Thony, Rennaz (CH)

(73) Assignee: KOENIG & BAUER AG, Würzburg (DE)

( * ) Notice: Subject to any disclaimer, the term of this patent is extended or adjusted under 35 U.S.C. 154(b) by 0 days.

(21) Appl. No.: 18/837,959

(22) PCT Filed: Dec. 22, 2022

(86) PCT No.: PCT/EP2022/087515
§ 371 (c)(1),
(2) Date: Aug. 13, 2024

(87) PCT Pub. No.: WO2023/198301
PCT Pub. Date: Oct. 19, 2023

(65) Prior Publication Data

US 2025/0108602 A1 Apr. 3, 2025

(30) Foreign Application Priority Data

Apr. 13, 2022 (DE) ..................... 10 2022 109 036.1

(51) Int. Cl.
*B41F 13/193* (2006.01)
*B41F 15/08* (2006.01)
(Continued)

(52) U.S. Cl.
CPC .......... *B41F 23/00* (2013.01); *B41F 15/0809* (2013.01); *H01F 7/02* (2013.01)

(58) Field of Classification Search
None
See application file for complete search history.

(56) References Cited

U.S. PATENT DOCUMENTS

2011/0168088 A1 7/2011 Raksha et al.
2021/0316545 A1* 10/2021 Berthon ............... B42D 25/405

FOREIGN PATENT DOCUMENTS

CA 2677034 A1 * 8/2008 ............. B05D 3/207
CN 103192591 A 7/2013
(Continued)

OTHER PUBLICATIONS

International Search Report of PCT/EP2022/087515 dated Apr. 19, 2023.

*Primary Examiner* — Leslie J Evanisko
(74) *Attorney, Agent, or Firm* — Mattingly & Malur, PC

(57) ABSTRACT

Examples include a cylinder for aligning magnetic or magnetizable particles contained in a coating agent on a substrate. In the region of the outer circumference of the cylinder, in a matrix-like manner, a number of magnetic elements that provide magnetic fields are arranged in n rows extending in an axially parallel manner and in m columns extending in the circumferential direction. Additionally, suction elements with suction openings pointing outwards are also arranged in the circumferential region. A plurality or all of the magnetic elements are arranged one behind the other and are each combined with at least one assigned suction element in respective modular units as action units in a plurality or all of the columns of magnetic elements. The action units can be positioned in each case independently of
(Continued)

the other action units in the circumferential direction and/or can be detached from the cylinder.

14 Claims, 14 Drawing Sheets

(51) Int. Cl.

| | |
|---|---|
| ***B41F 19/00*** | (2006.01) |
| ***B41F 23/00*** | (2006.01) |
| ***H01F 7/02*** | (2006.01) |

(56) References Cited

FOREIGN PATENT DOCUMENTS

| | | | |
|---|---|---|---|
| DE | 112012006348 | B4 | 9/2018 |
| EP | 2114678 | B1 | 7/2011 |
| WO | 2014037221 | A1 | 3/2014 |
| WO | 2020094291 | A1 | 5/2020 |

* cited by examiner

CYLINDER FOR ALIGNING MAGNETIC OR MAGNETIZABLE PARTICLES CONTAINED IN COATING AGENT ON A SUBSTRATE AND MACHINE FOR GENERATING OPTICALLY VARIABLE IMAGE ELEMENTS

CROSS-REFERENCES TO RELATED APPLICATIONS

This application is the US national phase, under 35 USC § 371, of PCT/EP2022/087515, filed on Dec. 22, 2022, published as WO 2023/198301 A1 on Oct. 19, 2023, and claiming priority to DE 10 2022 109 036.1, filed Apr. 13, 2022, and all of which are expressly incorporated by reference herein in their entireties.

TECHNICAL FIELD

Examples herein relate to a cylinder for aligning magnetic or magnetizable particles contained in a coating agent on a substrate and to a machine for generating optically variable image elements. In some examples, the cylinder includes, in a region of an outer circumference thereof in a matrix-like manner, a number of n×m (where n and m are integers greater than one) magnetic elements that provide magnetic fields, and which are arranged in n rows extending in an axially parallel manner and in m columns extending in a circumferential direction. Additionally, in the circumferential region, the cylinder includes suction elements with suction openings pointing outwards.

Similarly, in some examples, the machine includes a substrate infeed, at least one printing mechanism, by which the substrate guided on a transport path through the machine is and/or can be printed at least on a first side in a matrix-like manner with multiple-ups having a number m of columns and a number n of rows. The machine further includes a product receiving system, by which processed substrate can be combined into bundles, as well as at least one alignment device provided in the substrate path between the printing mechanism and the product receiving system for aligning magnetic or magnetizable particles.

BACKGROUND

A printing machine comprising a screen printing unit and a device for aligning magnetic or magnetizable particles contained in the printing ink or the varnish is known from EP 2 114 678 B1, wherein the device comprises a cylinder that has, around the circumference, a plurality of magnetic-field-generating elements arranged in multiple axially adjustable supporting rings. The supporting rings have apertures at their inner circumference, which cooperate with apertures on a shaft carrying the supporting rings for conducting through suction air. In one example, apertures on the shaft can be selectively closed by plugs, for example screw elements. The supporting rings can be axially positioned on a shaft and can be clamped thereon by a tensile force acting in the circumferential direction.

US 2011/0168088 A1 relates to a device for orienting magnetic flakes, wherein in one embodiment magnets are arranged on the circumference of disks, which are arranged on an axis and can be replaced by disks having a different distribution.

A device for aligning magnetic or magnetizable particles contained in coating agent, comprising a cylinder that, in the region of its outer circumference, comprises magnetic elements arranged in a matrix-like manner, is known from CN 103192591 A. Groups of magnetic elements that are arranged axially next to one another, the groups being arranged one behind the other in the circumferential direction, are in each case arranged on axially extending carrier elements and are axially movable thereon. After having been axially positioned, the magnetic elements can be clamped in the carrier elements by screws in the relevant carrier element that act in the circumferential direction. The carrier elements can be positioned in the circumferential direction. The axially extending carrier elements are clamped at the ends by end-face supporting rings extending in the circumferential direction.

WO 2014/037221 A1 discloses a magnetic cylinder comprising multiple cylinder sections, which on their circumference comprise multiple magnetic elements one behind the other and regions that extend around both sides of the magnetic elements and have suction air openings. Support elements having a cylindrical circumferential surface are provided between such cylinder sections.

DE 11 2012 006 348 B4 discloses a magnetic cylinder including multiple spaced-apart carrier rings, which are adjustable in terms of the axial position thereof on a cylinder body. These carrier rings have annular grooves on the outer circumference, which in the circumferential direction can be consecutively equipped with magnetic devices and can be adjusted in the circumferential direction on the relevant carrier ring after set screws have been loosened. Openings of a suction air conduction system open into the bottom of the annular grooves as well as into an interposed shoulder and can be used to take in suction air from suction openings of a cover plate forming the cylinder shell.

WO 2020/094291 A1 discloses a magnetic cylinder comprising axially movable ring elements at which magnetic devices can be positioned in the circumferential direction, wherein suction air openings are provided in the edge region of the ring elements, via which suction air can be taken in via suction openings of a cover plate arranged thereabove. One cover plate having openings is provided for each ring element.

SUMMARY

It is an object of some examples herein to provide a cylinder for aligning magnetic or magnetizable particles contained in a coating agent on a substrate, and to a machine for generating optically variable image elements.

The object is achieved according to some examples herein by the above-discussed cylinder in which a plurality or all of the magnetic elements that are arranged one behind the other are in each case combined with at least one assigned suction element in respective modular units as active units in a plurality or all of the columns of magnetic elements. As such, the active units can be positioned as a whole and in each case independently of all other such active units in the circumferential direction and/or can be detached from the cylinder. Additionally, the above-discussed machine includes the alignment device with a cylinder as described herein.

The advantages that can be achieved with the features according to the examples herein are, in particular, that high accuracy during the production of optically variable image elements and/or high flexibility in the application or process spectrum for the provision of optically variable image element can be made possible or enhanced.

In a suitable embodiment of a cylinder for aligning magnetic or magnetizable particles contained in coating agent on a substrate, this cylinder comprises, in the region of the outer circumference thereof in a matrix-like manner, a number of n×m (in words: n times m, with n, m∈(integers >1) elements that provide magnetic fields, magnetic elements for short, which are arranged in n rows extending in an axially parallel manner and in m columns extending in the circumferential direction, as well as, in the circumferential region, suction elements with suction openings pointing outwards, wherein, in a particularly advantageous embodiment, multiple of the magnetic elements that are arranged one behind the other are in each case combined with at least one assigned suction element in respective modular units as active units in multiple of the columns of magnetic elements, and as such can be positioned as a whole and in each case independently of all other such active units in the circumferential direction and/or can be detached from the cylinder. Advantageously, the active units, on the underside facing into the cylinder interior, comprise at least one line interface and/or a cylinder inner body, which is comprised by the cylinder and directly or indirectly carries the respective active unit on the circumference thereof, on the outer side comprises a plurality of line interfaces for conducting through suction air.

In this way, free positioning of magnetic elements in the circumferential direction is made possible, wherein respective assigned suction elements have a defined position relative to the relevant magnetic element and ensure good retention.

Preferably, the active units, on the underside thereof facing into the cylinder interior, comprise at least one line interface, and a cylinder inner body, which is comprised by the cylinder and directly or indirectly carries the respective active unit on the circumference thereof, on the outer side comprises a plurality of line interfaces for conducting through suction air.

In a particularly advantageous refinement, at least two magnetic elements provided one behind the other in the same column are arranged on or in magnetic element carriers which differ from one another and can be positioned independently of one another in the circumferential direction at the cylinder, wherein the at least two magnetic elements arranged one behind the other at the respective magnetic element carriers are mounted so as to be adjustable relative to the magnetic element carrier carrying the magnetic element in the circumferential direction within an adjustment range.

In an alternative or additional advantageous refinement, at least two or all magnetic elements that are provided one behind the other in the same column are mounted as a group at or on a shared carrier element and can be varied with respect to their axial position in or at the cylinder by way of the same, collectively and independently of magnetic elements of an adjoining column, wherein, in a particularly advantageous embodiment, the at least two or all magnetic elements of the same column are arranged at respective magnetic element carriers which, in turn, can be positioned at the shared support element and/or detached from the support element independently of one another in the circumferential direction, and wherein the at least two or all magnetic elements of the same column are mounted on the respective magnetic carrier element so as to be adjustable relative thereto in the axial direction within an adjustment range. Advantageously, a carrier element which comprises multiple active units on the circumference thereof and is carried by the cylinder inner body comprises, on the side facing into the cylinder interior, a plurality of line interfaces cooperating with line interfaces on the cylinder inner body for conducting through suction air and, on the outer side, comprises a plurality of line interfaces cooperating with line interfaces of active units for conducting through suction air.

A particularly advantageous embodiment of a machine for generating optically variable image elements on a substrate comprises a substrate infeed, at least one printing mechanism by which substrate guided on a transport path through the machine is and/or can be printed at least on a first side in a matrix-like manner with multiple-ups having a number m of columns and a number n of rows, a product receiving system, by which processed substrate can be combined into bundles, as well as an alignment device, which is provided in the substrate path between the printing mechanism and the product receiving system, for aligning magnetic or magnetizable particles with a cylinder, wherein the cylinder is preferably designed according to an embodiment or combined embodiment of one of the above-mentioned cylinders.

High accuracy during the treatment of optically variable image elements and/or high flexibility in the application or process spectrum for the provision of optically variable image elements can also be made possible or enhanced in combinations of embodiments regarding the clamping device fixing the ring elements and/or an embodiment as modular units and/or by a movability of individual or all magnetic elements in the axial and/or circumferential directions and/or by a clamping device clamping the magnetic elements or modular units.

In an advantageous embodiment, multiple modular units, each of which has on its underside at least one line interface for conducting through suction air, are provided on a cylinder inner body or on shared carrier elements arranged on the cylinder inner body, wherein the cylinder inner body and/or the respective carrier element, on an outwardly facing side, comprises a plurality of line interfaces having selectively closable feedthroughs, in particular boreholes, for conducting through suction air.

A particularly advantageous embodiment of an above-mentioned cylinder has, in the region of the outer circumference thereof, viewed in the axial direction, a number of, for example, four to eight columns or groups next to one another, each including a number of, for example, 2 to 12, in particular 5 to 10, elements that provide magnetic fields, magnetic elements for short, and that are arranged one behind the other in the circumferential direction.

Here and hereafter, unless explicitly stated as deviating therefrom, the axial direction refers to a direction extending parallel to the cylinder rotation axis.

Basically independent of the embodiment including the above-mentioned active units, in particular, however, advantageously in conjunction therewith, an advantageous refinement of the device for alignment, wherein at least two, preferably all, of the magnetic elements provided one behind the other in the same column are mounted as a group at or on a shared carrier element and can be varied with respect to their axial position in or at the cylinder by way of the carrier element, collectively and independently of the magnetic elements of an adjoining column, the at least two or all magnetic elements of the relevant group are arranged at respective magnetic element carriers so as to be positionable in the circumferential direction independently of one another at the shared carrier element and/or so as to be detachable from the carrier element and are mounted on the relevant magnetic element carrier so as to be adjustable in the axial direction within an adjustment range. This preferably applies to multiple, in particular all, columns.

Basically independent of the embodiment including the above-mentioned active units and/or of an above-mentioned embodiment including axially positionable magnetic elements, preferably, however, in conjunction with one or more of the described advantageous embodiments, an advantageous refinement of the device for aligning magnetic or magnetizable particles contained in coating agent on a substrate comprises a cylinder which comprises, in the region of the outer circumference thereof in a matrix-like manner, a number, for example n×m, with n, m∈(integers >1), of magnetic elements, which are arranged in axially parallel extending rows and in columns extending in the circumferential direction, wherein at least two, preferably all, of the magnetic elements provided one behind the other in the same column are arranged on or in magnetic element carriers which differ from one another and can be positioned independently of one another in the circumferential direction at the cylinder, and wherein the at least two or all magnetic elements arranged at the respective magnetic element carriers are mounted so as to be adjustable relative to the magnetic element carrier carrying the respective magnetic element in the circumferential direction within an adjustment range.

Basically independent of the embodiment of the cylinder including the above-mentioned active units and/or of an above-mentioned embodiment of the cylinder including axially positionable magnetic elements and/or of an above-described embodiment of the cylinder including magnetic elements that can be positioned in the circumferential direction, preferably, however, in conjunction with one or more of the described advantageous embodiments, a particularly advantageous refinement of the cylinder comprises, in the region of the outer circumference thereof, as viewed in the axial direction, a number m of groups next to one another, each comprising a number of magnetic elements arranged one behind the other in the circumferential direction, wherein multiple or all magnetic elements of a group, in particular multiple or all groups, are mounted at or on a shared ring-like carrier element arranged on a cylinder inner body and can be positioned on the carrier element in the circumferential direction, and wherein the magnetic elements, a mount accommodating the magnetic elements or a magnetic element carrier carrying the magnetic elements each comprise on both sides, viewed in the axial direction of the cylinder, at least one clamping element, whose effective end, in the mounted state, engages under a stop surface that extends in the circumferential direction on the respective end face of the ring-like carrier element and is directed inwards, that is, with its surface normal pointing into a cylinder interior, and/or counteracts a radial removal of the magnetic element or magnetic element carrier by cooperation with the clamping element situated in the clamping position.

In particular a machine, for example, a securities printing machine, for generating optically variable image elements on printing substrate sections, comprising a printing substrate infeed, in particular configured as a sheet feeder, comprising at least one printing mechanism, in particular a screen printing mechanism, by which substrate guided on a transport path through the machine is printed and/or can be printed at least on a first side in a matrix-like manner with multiple-ups of a number of columns and a number of rows, and comprising a product receiving system, by which processed substrate can be combined into bundles, in particular configured as a pile delivery, preferably comprises a device for aligning magnetic or magnetizable particles with a cylinder in an above-described or combined embodiment in the transport path of the printing substrate sections between the printing mechanism and the product receiving system.

Further details and variant embodiments can be found in the exemplary embodiments.

BRIEF DESCRIPTION OF THE DRAWINGS

Exemplary embodiments of the invention are illustrated in the drawings and will be described in greater detail below. The figures show:

FIGS. 2A-2B a schematic representation of a substrate printed in print elements with optically variable coating agent, wherein FIG. 2A shows a state with not yet oriented magnetic or magnetizable particles, and FIG. 2B shows a state after alignment of an image-producing part, here by way of example in the form of a digit "1";

DETAILED DESCRIPTION

Figure 1:
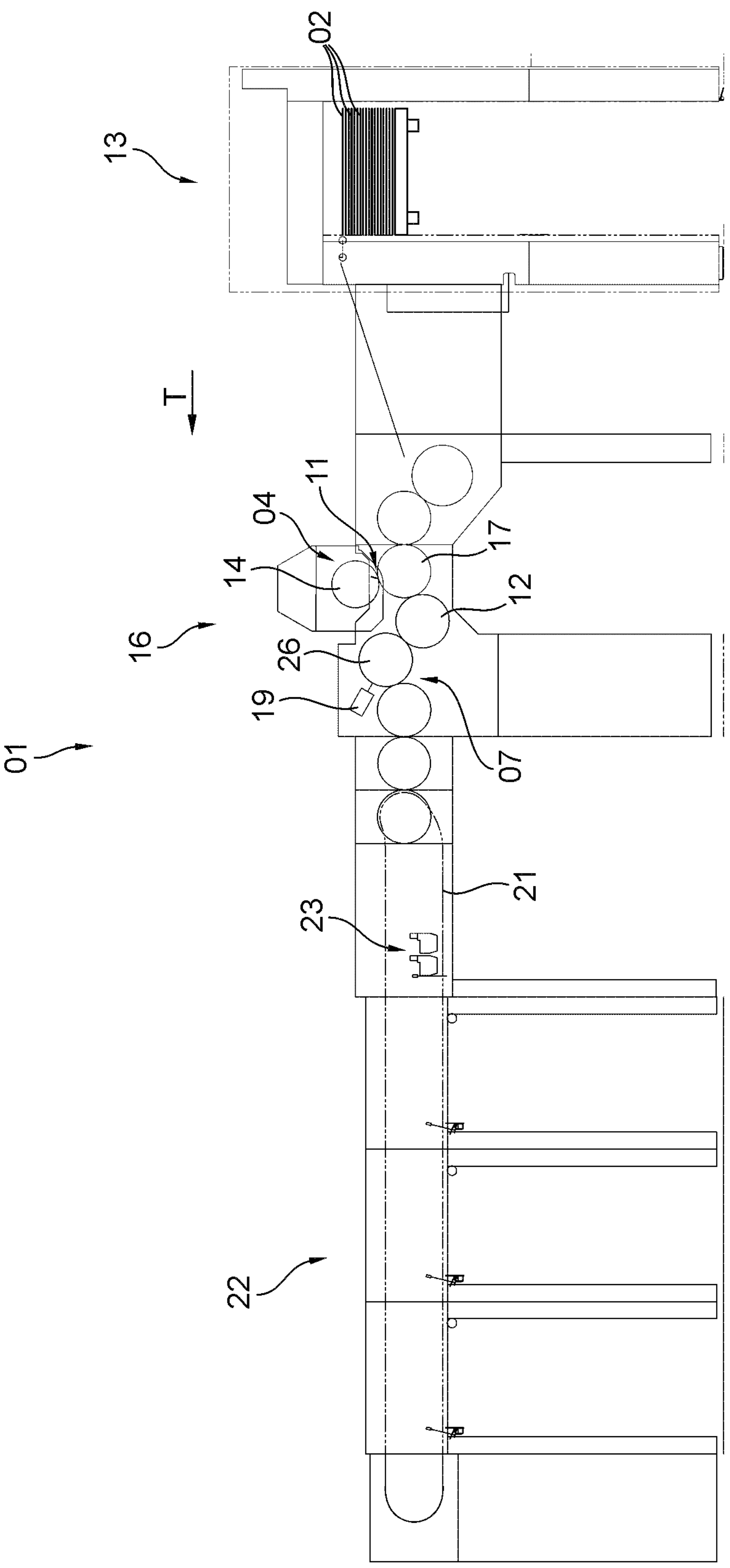
FIG. 1 an exemplary embodiment of a machine for generating optically variable image elements on a substrate.
Figure 2A:
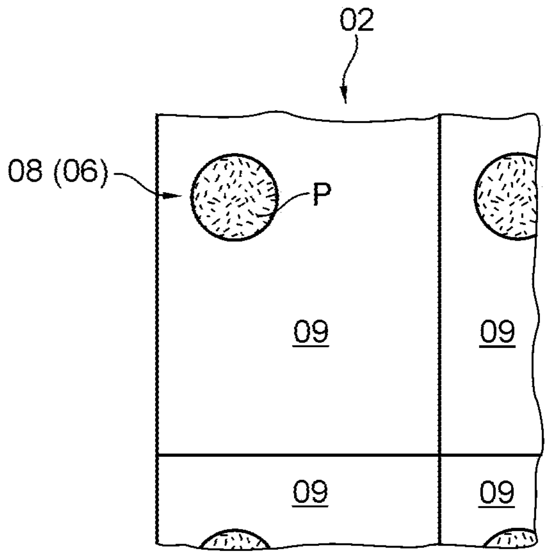
Figure 2B:
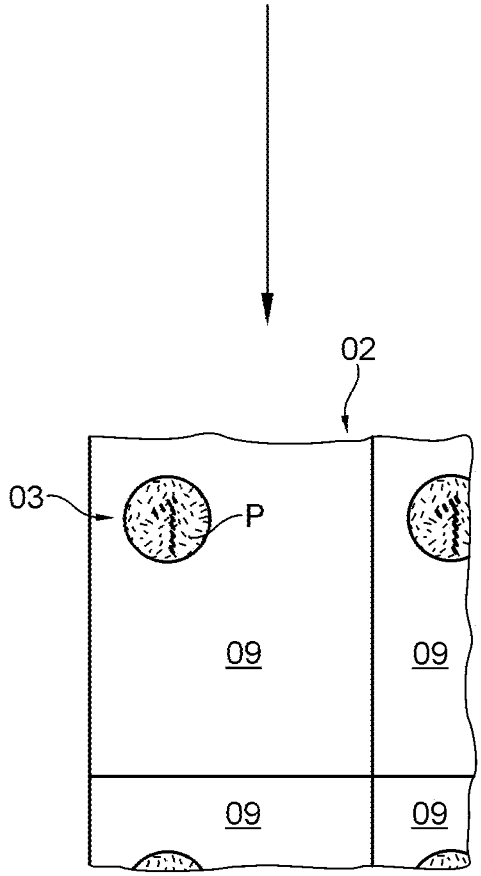

A machine 01, for example a printing machine 01, in particular a securities printing machine 01, for generating optically variable image elements 03 on a substrate 02, for example a web-format or sheet-format printing substrate 02, comprises an application device 04, for example a printing mechanism 04, by which an optically variable coating agent 06, for example optically variable printing ink 06 or varnish 06, can be applied at at least one application point, for example printing nip 11, to at least a first side of the substrate 02, for example of the printing substrate 02, across the entire surface area or in partial regions in the form of print image elements 08, and a device 07 for aligning particles P that are contained in the optically variable coating agent 06 applied to the substrate 02 and that are responsible for the optical variability (see, for example, FIG. 1). This device 07 is also referred to as an alignment device 07 for short or, since it produces an image of the optically variable pattern or motif as a result of a defined alignment of the particles P, is also referred to as an image-producing alignment device 07 in the following. An application of coating agent 06 that contains particles P onto the printing substrate 02 and an image element 03 obtained by a subsequent image-producing alignment of previously randomly oriented particles P are schematically shown, for example, in FIGS. 2A and 2B based on an illustration of the digit "1." Here, FIG. 2A represents a state in which the coating agent 06 has been applied and, for example, is still present in randomly oriented form, and FIG. 2B represents a state in which an image-producing alignment has taken place.

The print image elements 08 made up of variable coating agent 06 which are applied onto the substrate 02 by the application device 04 prior to the treatment by the alignment device 07 can correspond to the optically variable image elements 03 to be generated in terms of size and position, or possibly may also be larger than these, and possibly can even extend across the surface area of several multiple-ups 09. In the case of larger print image elements 08, for example, an optically variable image element 03 is not generated by alignment on the entire surface area that is coated with optically variable coating agent 06.

The particles P responsible for the optical variability contained here in the coating agent 06, for example the printing ink 06 or the varnish 06, are magnetic or magnetizable, non-spherical particles P, for example pigment particles P, hereafter also referred to as magnetic flakes for short.

Figure 3:
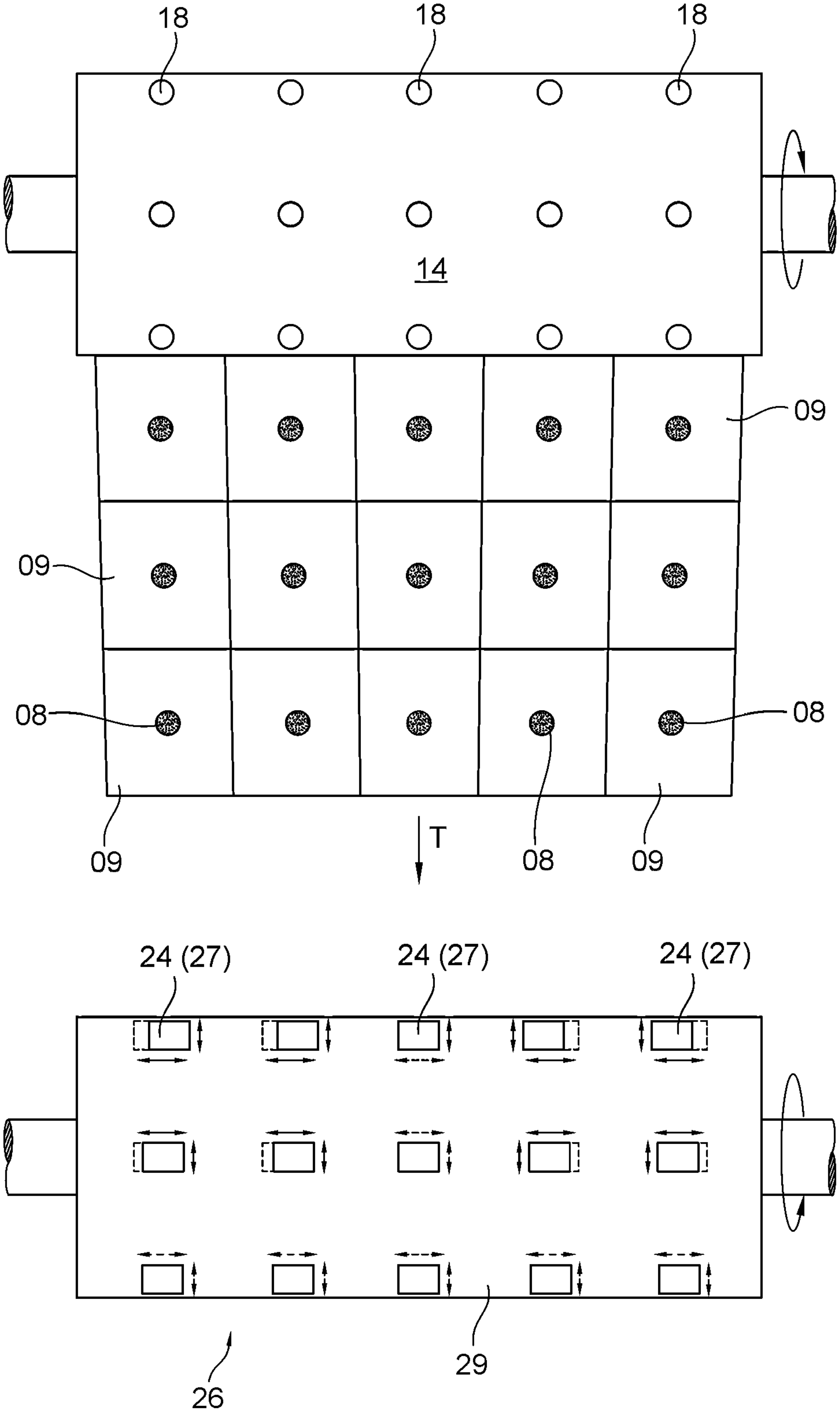
FIG. 3 a schematic representation of a printing- and downstream alignment process with an image-producing printing mechanism cylinder and a cylinder comprising magnetic elements, shown by way of example with a substrate sheet widening trapezoidally towards the trailing end.

The machine 01 is preferably designed to produce multiple-ups 09, for example securities 09, and in particular bank notes 09. This shall in particular also cover the production of intermediate securities products, for example the production of printing substrate 02, in particular in the form of web-format or sheet-format printing substrate sections 02, in particular printing substrate sheets 02, using print images of multiple securities 09. The substrate 02 can be formed by, for example cellulose-based or preferably cotton fiber-based, or at least cellulose-containing or preferably cotton fiber-containing, paper, by plastic polymer or by a hybrid product thereof. It may be present uncoated prior to being coated in the above-described application device 04, or may already have been coated, or it may be unprinted or already have been printed once or multiple times in one or more upstream processes, or may have been mechanically processed in another manner. Preferably, several multiple-ups 09, for example bank notes 09 to be produced or their print images, are arranged on a printing substrate section 02 that is formed by a longitudinal section of web-format substrates 02 or formed by a sheet of a sheet-format substrate 02 in a matrix-like manner, next to one another in rows extending transversely to the transport direction T and one behind the other in columns extending in the transport direction T, or are to be arranged during the course of the processing operation of the substrate 02 (indicated, for example, in FIGS. 2A-2B and in FIG. 3).

The machine 01 designed as a printing machine 01 can generally comprise one or more printing mechanisms 04 of arbitrary printing methods. For the sake of simplicity, however, in the embodiment illustrated here it comprises a printing mechanism 04, in particular a printing mechanism 04 operating according to the flexographic printing method, or preferably according to the screen printing method, by which the optically variable coating agent 06 is or can be applied onto a first side of the printing substrate 02. A greater film thickness, compared to other printing methods, can be applied, for example, by the described printing methods, in particular the screen printing method. The expression of the "first side" of the substrate 02 or printing substrate 02 is selected arbitrarily and is intended here to denote the side of the printing substrate 02 onto which optically variable coating agent 06 to be treated downstream by the alignment device 07 is or was or can be applied.

In the illustrated and preferred embodiment, the printing machine 01 comprises a substrate infeed 13, preferably designed as a sheet feeder 13, from which the substrate 02 designed, for example, as a sheet-format printing substrate 02 is or can be fed, possibly via further printing or processing units, to the at least one printing mechanism 04, for example flexographic or preferably screen printing mechanism 04, applying the optically variable coating agent 06, which forms a printing nip 11 for printing, for example, a first side of the printing substrate 02 between a printing mechanism cylinder 14, in particular a forme cylinder 14, for example a screen printing cylinder 14, and a shared impression cylinder 17 (see e.g. FIG. 1).

Preferably, the printing mechanism 04 comprises a forme cylinder 14 as the image-producing cylinder, including a multiplicity of, in particular like and/or identical, image-producing print elements 18, hereafter also referred to as print motifs 18 or, in particular like and/or identical, groups of image-producing print elements 18 or print motifs 18 around the circumference, which, on a circumferential length corresponding to the print image length, are arranged in multiple, for example a number, for example, of four to eight, in particular five to seven, for example six, columns that are spaced apart from one another transversely to the transport direction T and, on a cylinder width corresponding to the print image width, in multiple rows that are spaced apart from one another in the transport direction T. In the case of a printing mechanism 04 operating according to the flexographic printing method, these print motifs 18 are designed in the manner of letterpress print reliefs, and in the preferred case of a printing mechanism 04 operating according to the screen printing method, they are designed in the manner of screen printing stencils.

The printing substrate 02 can be fed from the printing mechanism 04 applying the optically variable coating agent 06 to the alignment device 07 via conveying means, for example one or more conveying devices 12 designed as transport cylinders 12. In the case of a web-format printing substrate 02, the conveying means could be formed by one or more positively driven and/or non-driven rollers.

After passing through the alignment device 07, which is described in detail below, the printing substrate 02 can be feed to a further, for example second, conveying device 21 directly or via further conveying means, for example further transport cylinders, and can be fed thereby to a product receiving system 22 for receiving the printing substrate 02 treated and/or processed in the machine 01, and in the case of sheet-format printing substrate 02 can be fed to a pile delivery 22. For the preferred case of sheet-format printing substrate 02, sheet-conveying means, for example one or more transfer cylinders or drums, or, as illustrated here, a conveying device 21 configured, for example, as a revolving gripper conveyor 21, in particular a so-called chain gripper system 21, are provided as conveying means here, which receive the printing substrate sheets 02 from the transport path section of the alignment device 07 via possibly one or more further transport cylinders and, for example, feed these to the pile delivery 22.

At least one drying device comprising one or more dryers 23, for example radiation dryers 23, directed at the first side of the printing substrate 02, and possibly a cooling unit (not shown), for example a cooling roller, can be provided at the transport path leading away from the alignment device 07. In a refinement that is not shown, an inspection device (not shown), for example an area scan camera or a line camera, can be provided on the transport path between the alignment device 07 and the pile delivery 22.

In an advantageous refinement, the printing mechanism 04 and the alignment device 07 can be structurally combined, for example in the manner of a module, to form a device 16 for generating optically variable image elements. In a refinement, such a module can, for example, be provided several times one behind the other in the machine 01. In the advantageous configuration in the manner of a module, the device 16 is or can be inserted into the transport path of the machine 01 to be fitted therewith using input-side and output-side interfaces to corresponding interfaces of a conveyor system, which continues upstream and downstream.

Even though the alignment device 07 described hereafter in detail is essentially arbitrary in terms of the designs, variant embodiments or configurations thereof, it is preferably provided or can be provided in an above-described machine 01 or printing machine 01.

The alignment device 07 for creating optically variable image elements 03, for example for creating the optically variable effect in the optically variable coating agent 06 applied previously, for example in the form of print image elements 08, onto the substrate 02, in particular onto the printing substrate 02, comprises a defined transport path along which the substrate 02 to be conveyed through the alignment device 07 is fed or can be fed from an entrance area, in which the substrate 02 to be treated and having, on the first side thereof, an optically variable coating agent 06, is brought or can be brought into operative connection in a defined manner with an alignment device 26 that comprises elements 24 providing magnetic fields, magnetic elements 24 for short, serving as operative elements 24, preferably in such a way that the magnetic elements 24 of the alignment device 26, which serve image-producing orientation purposes, and the printing substrate 02 printed with the printing ink 06 containing the particles P move synchronously with respect to one another, at least on a section of the transport path. The alignment device 26 is configured as a magnetically active cylinder 26 here, magnetic cylinder 26 for short, which around the circumference comprises the arrangement of magnetic elements 24 and via which the printing substrate 02 is guided or conveyed, starting from an entrance area, in the direction of an exit area of the alignment device 07.

The magnetic elements 24 can be formed directly by one-piece or multi-piece magnets 27 themselves or can preferably comprise one or more magnets 27, which are arranged, preferably detachably or at a mount 28, for example on or in a base 28. Here, in general, magnets 27 shall be understood to mean magnetically active devices that, permanently or switchably, at least toward the side of the transport path, induce a magnetic field, which is sufficiently strong, in particular for aligning particles P contained in the coating agent 06 on the substrate 02 being guided over the same, as described here. The magnets 27 can be formed by one or more permanent magnets with or without engraving, by solenoids, or by combinations of one or more permanent magnets and/or one or more solenoids. Regardless of whether a single magnet or a combination of multiple magnets, for example permanent magnets and/or solenoids, is involved, the term magnet 27 hereafter shall also be understood to mean multiple magnets 24 that are assigned to the same magnetic element 27 and, in their entirety, form a magnetic unit, unless explicitly expressed otherwise. The magnetic element 24 shall also be understood to include embodiments comprising multiple one-piece or multi-piece magnets 27 that are encompassed by the magnetic element 24 and spaced apart from one another, as they may be employed, for example, if the same multiple-up 09 is to be acted upon by a respective magnetic field at two different points. Such a magnet 27 or such an arrangement of multiple magnets 27 of the same magnetic element 24 can be accommodated in a housing 38 of the magnetic elements 24, which, for example, is arranged in or on the mount 28 so as to be detachable from the mount 28.

Generally, it is also possible for two such magnetic cylinders 26 to be provided in the transport path, which are arranged on the same side, or on different sides, of a substrate 02 to be conveyed along the transport path.

In an advantageous embodiment, a drying and/or curing device 19, for example a radiation dryer 19, in particular a UV radiation dryer 19, UV dryer 19 for short, is assigned to the alignment device 07, which is preferably configured as a UV LED dryer 19 and/or is directed at a point in the transport path at which the substrate 02 cooperates with the magnetic cylinder 26.

The magnetic cylinder 26 is arranged in the transport path of the substrate 02 to be conveyed, preferably on the second side thereof, so as to point outwardly with the first side, which is coated in particular upstream inline with optically variable coating agent 06, while passing the magnetic cylinder 26, in particular while being transported over the magnetic cylinder 26.

The magnetic cylinder 26 comprises a one-piece, or preferably a multi-piece, cylinder body 29 at or on which the magnetic elements 24 are, preferably detachably, arranged. The one-piece, or preferably multi-piece, cylinder body 29 can be or is rotatably mounted in a frame. The term of the cylinder body 29 shall encompass both closed structures, i.e., having a more or less closed outer cylinder surface, and open structures, i.e., scaffolding-like or frame-like structures, such as the example illustrated with regard to FIG. 4.

The magnetic cylinder 26 comprises the plurality of magnetic elements 24 in the region of the side facing the substrate path, for example, in the region of the outer circumference, in particular in the region of an outer cylindrical shell surface of the cylinder body 29, which are used to orient at least a part of the magnetic or magnetizable particles P of the coating agent 06 applied onto the passing printing substrate 02.

In particular for the case of a plurality of multiple-ups 09 per substrate section, for example per printing substrate sheet or substrate sheet 02, which is preferred and described here, viewed in the axial direction, multiple columns or groups, in particular a number m ($m \in$(integers >1)) of columns or groups corresponding to the number of columns on the printing substrate section 02, each comprising multiple rows, in particular a number n (n∈(integers >1)) of axially parallel extending rows corresponding to the number of rows of multiple-ups 09 on the printing substrate section 02 to be treated, or, viewed in the transport direction T of the substrate 02 and/or in the circumferential direction of the cylinder body 29, magnetic elements 24 arranged in a column or group one behind the other are provided or arranged in a matrix-like manner at the cylinder 26, that is, a number of n×m, in words: n times m, with n, m∈(integers >1) (in words: with n and m from the set of integers greater than one), magnetic elements 24 are provided in a matrix-like manner around the outer circumference. They are preferably arranged in such a way that, per column or group, the same number n of magnetic elements 24 is provided around the circumference and arranged in axially parallel extending rows and/or, in particular, so that these, when rolled out on the substrate 02, correspond to the pattern of the image elements 03 to which magnetic fields are to be applied on the substrate 02, assuming a correct register between the substrate position in the transport direction T and the cylinder angle position. An arrangement in rows or columns shall also be understood to encompass the corresponding lattice-shaped or matrix-shaped arrangement in the case where these are possibly slightly offset from one another in the axially parallel direction for correction or alignment purposes. The n magnetic elements 24 of the columns or groups arranged one behind the other are then, for example, at least arranged one behind the other in the circumferential direction so as to at least partially overlap, when rolled out, along a circular circumferential line and/or end up in multiple-ups 09 of the same column of a substrate 02 to be treated, even if they are possibly slightly offset from one another for correction or alignment purposes. For the axially parallel arrangement, the same applies accordingly to the slight mutual deviations in the circumferential direction that are present, if applicable.

By guiding the substrate 02 over a magnetic cylinder 26 configured in this way, wherein, for example, the first substrate side points outwardly when transported over the first cylinder 26, it is possible to cause particles P to be aligned or oriented in the region of the image elements 03 provided on the multiple-ups 09 by means of the magnetic elements 24, that is, here, for example, through the substrate 02.

The number m of the columns or groups is, for example, four to eight, in particular five to seven, for example six, and/or the number n of the magnetic elements 24 of a column or group is, for example, two to twelve, advantageously five to ten. The magnetic cylinder 26 or the cylinder body 29 thereof is preferably configured in such a way that the number m of columns or groups and/or the number n of rows or of magnetic elements 24 arranged one behind the other in a column or group can be varied, for example within the above-described boundaries, so as to adapt these to different requirements.

Preferably, the magnetic elements 24 are arranged or can be arranged detachably at the cylinder 26, preferably in or at a corresponding mount 28 together with the same, in such a way that they, in the mounted state, can be arranged at a defined location around the circumference of the cylinder 26 and can preferably be completely removed from the cylinder 26 and/or can be positioned around the circumference of the cylinder 26 in the axial and/or circumferential directions.

For an above-described matrix-like arrangement, magnetic elements 24 can be arranged and mounted at or in a cylinder body 29 so as to be mounted at the one-piece or multi-piece cylinder body 29 variably in their axial position relative thereto, at least relative to other magnetic elements 24 of the same column or group of magnetic elements 24. This can be implemented, for example, via axially extending guides around the circumference of the cylinder body 29, in or on which the relevant magnetic elements 24 are directly or indirectly positioned and can be moved into different axial positions. Such guides could generally be provided individually for individual magnetic elements 24 of a row (see, for example, the embodiment according to FIG. 11), but, if applicable, also continuously for multiple or all magnetic elements 24 of a same row. In this case, the guides could be provided on above-described axially extending carrier elements, which carry all magnetic elements 24 of the same row.

In an advantageous embodiment, the magnetic elements 24 of a respective row or preferably of a respective column, if applicable in addition to an independent axial and/or circumferential positionability of individual or all magnetic elements 24 of the row or column as described in more detail below, can be varied as a whole and independently of an adjacent row or column with respect to their position in the circumferential direction in the case of the row, and as a group with respect to their axial position on the magnetic cylinder 26 or on the cylinder body 29 in the case of the column described here. In the case of a row combined as a group, which is not shown here, in particular multiple, preferably the magnetic elements 24 of all rows, are each combined row by row, for example on axially extending carrier elements, as groups that can be positioned together in the circumferential direction. In the preferred case of columns combined into groups, in particular multiple, advantageously at least the two columns of at least three columns that are closest to the end face, advantageously all columns, are positioned as groups so as to be axially movable in this way in or at the magnetic element carrier 29, in particular cylinder body 29.

Figure 4:
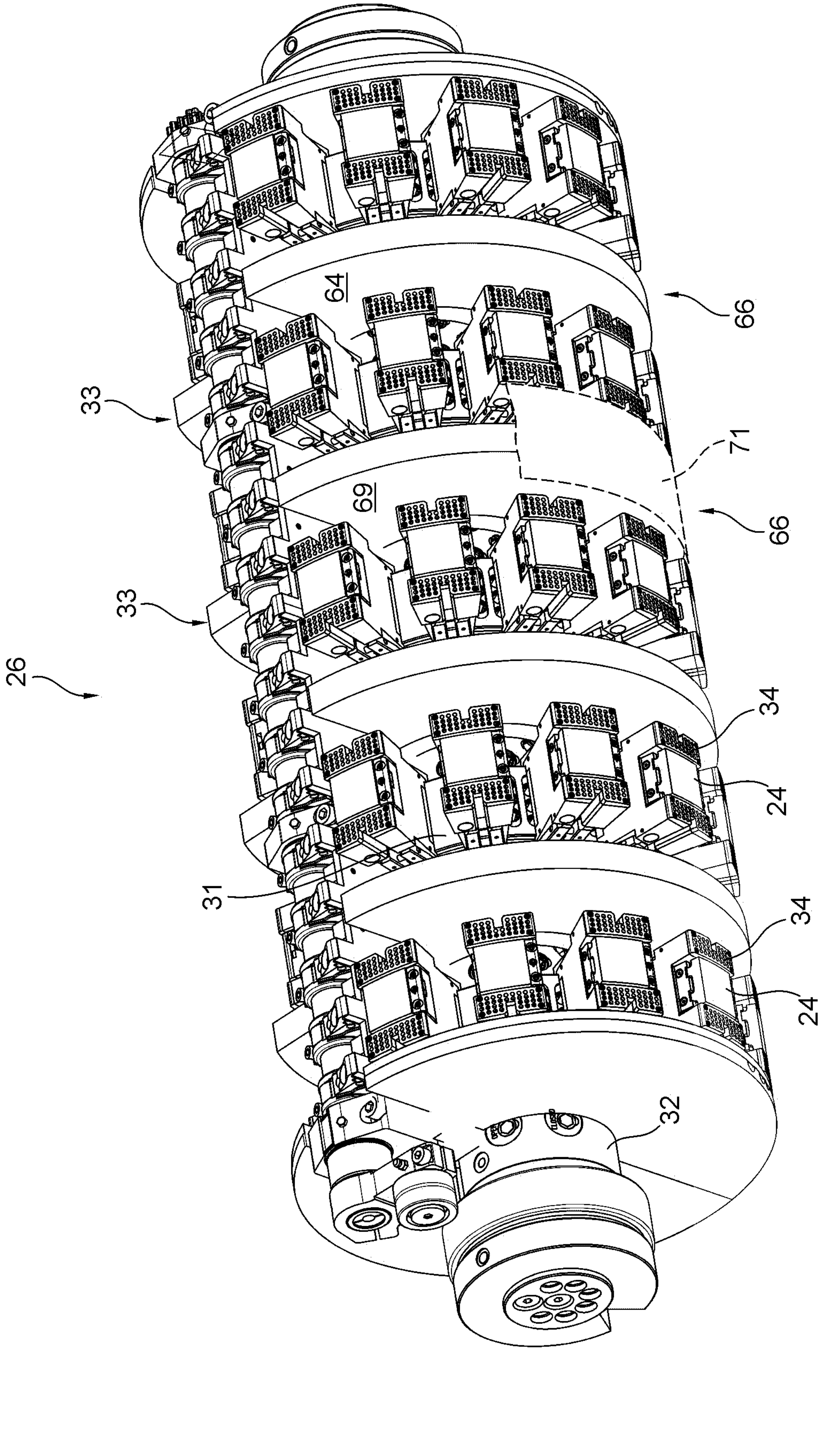
FIG. 4 a perspective view of an exemplary embodiment of a magnetic cylinder.
Figure 6:
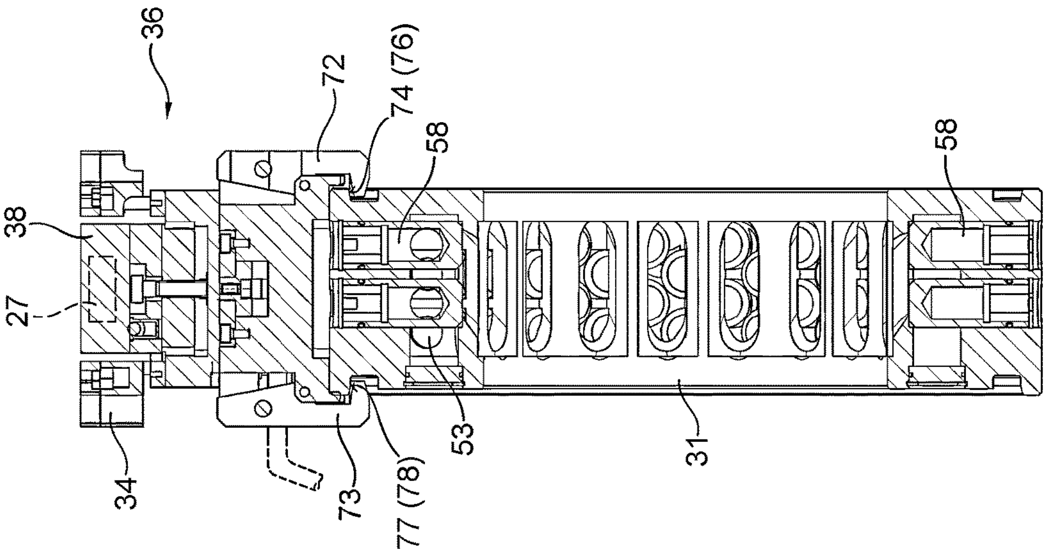
FIG. 6 a sectional view through a carrier element fitted with a magnetic element, but in a narrower design compared to FIG. 5.
Figure 5:
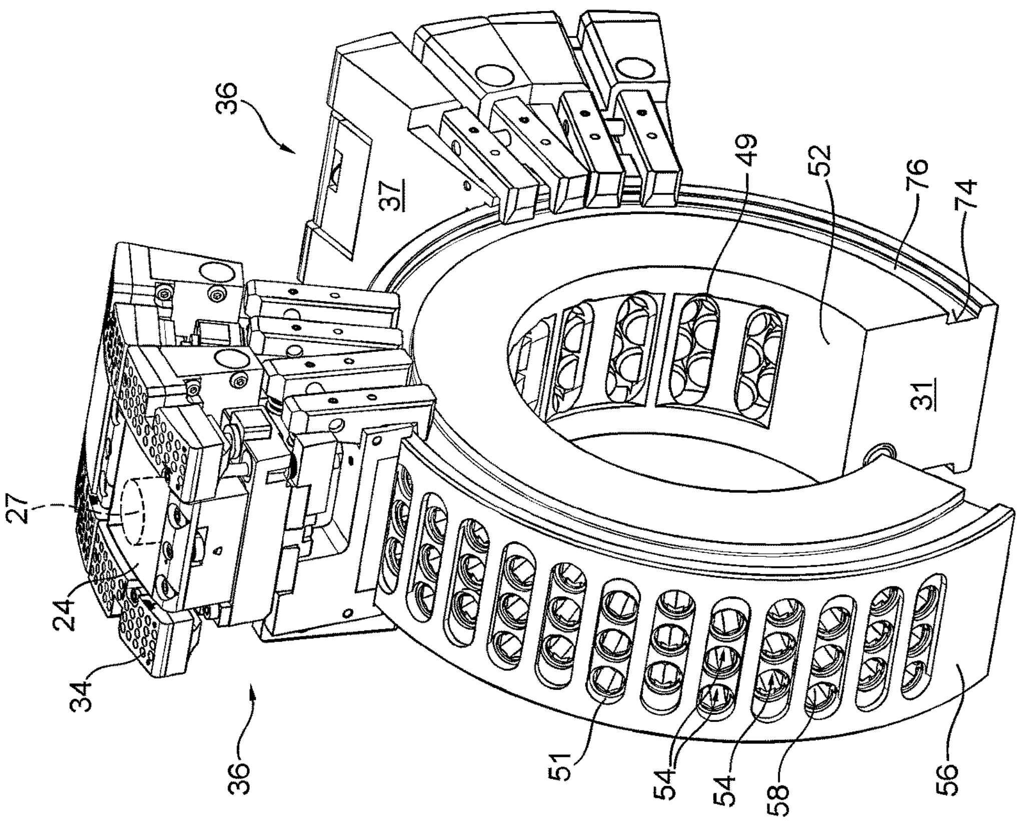
FIG. 5 a single representation of a carrier element fitted, by way of example, with multiple magnetic elements one behind the other in the circumferential direction.
Figure 8:
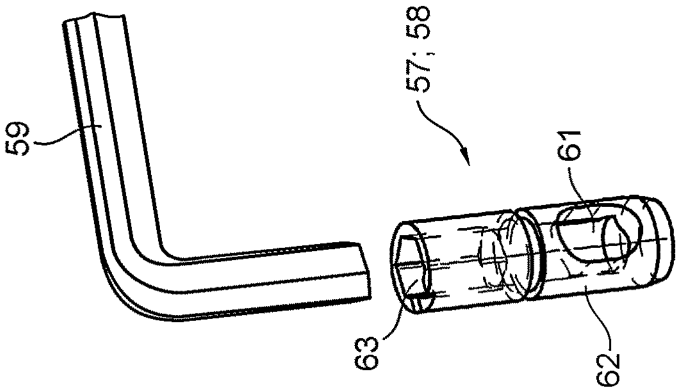
FIG. 8 an exemplary embodiment of a valve that selectively opens and closes a suction air opening.
Figure 7:
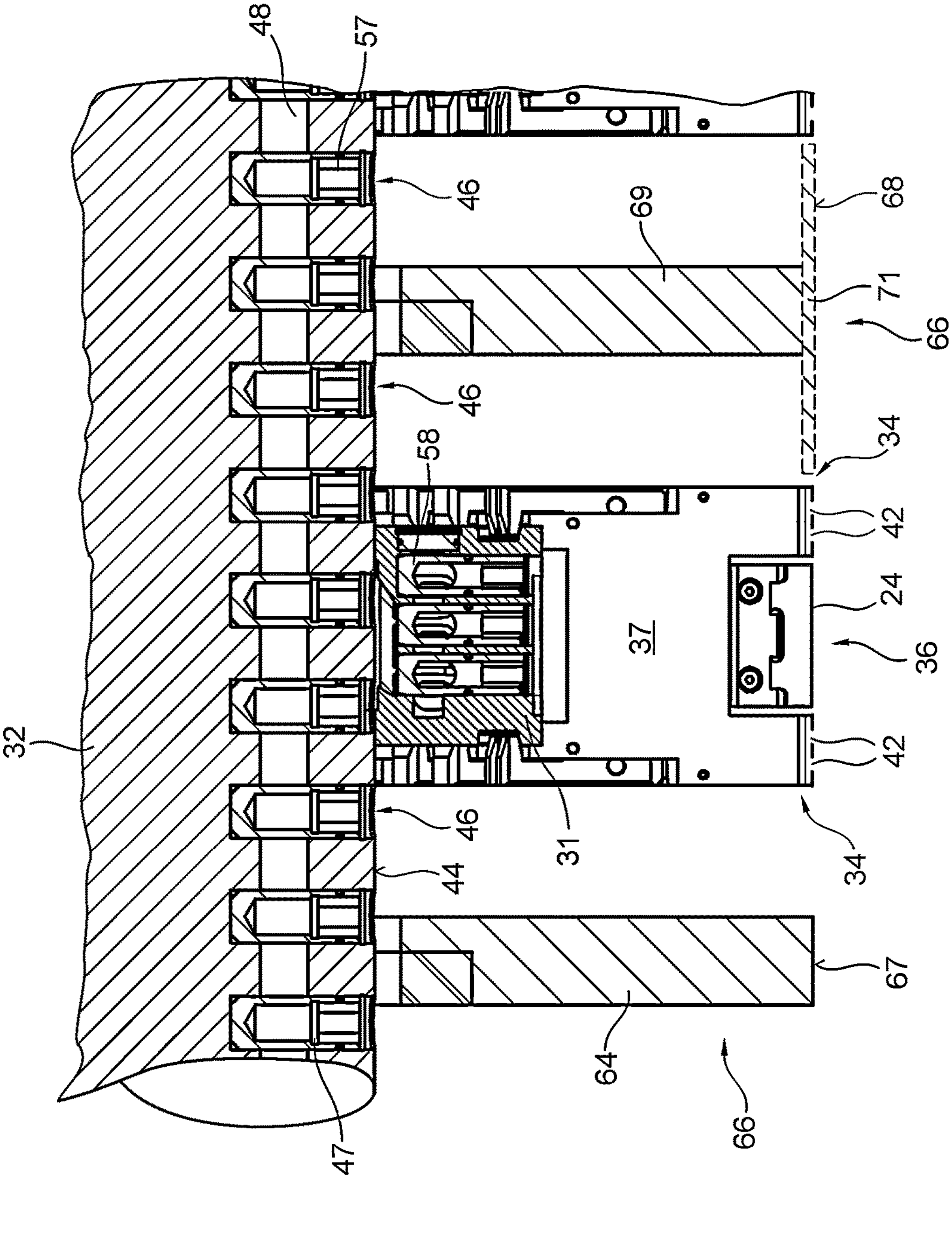
FIG. 7 a sectional view of a longitudinal section through a cylinder according to FIG. 4.
Figure 9:
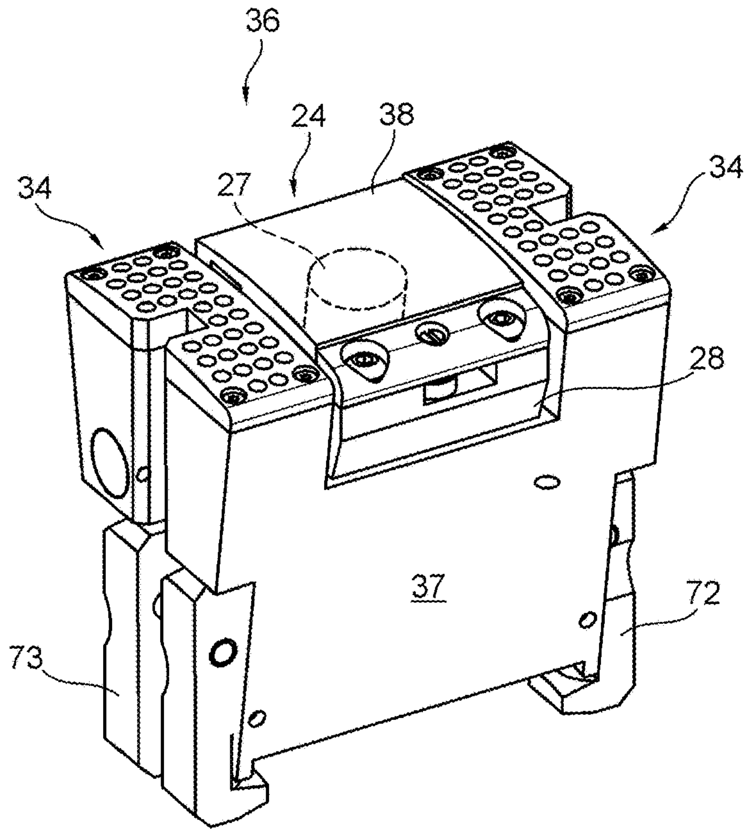
FIG. 9 an exemplary embodiment of a less complex design of an active unit comprising a magnetic element and a suction element.
Figure 10:
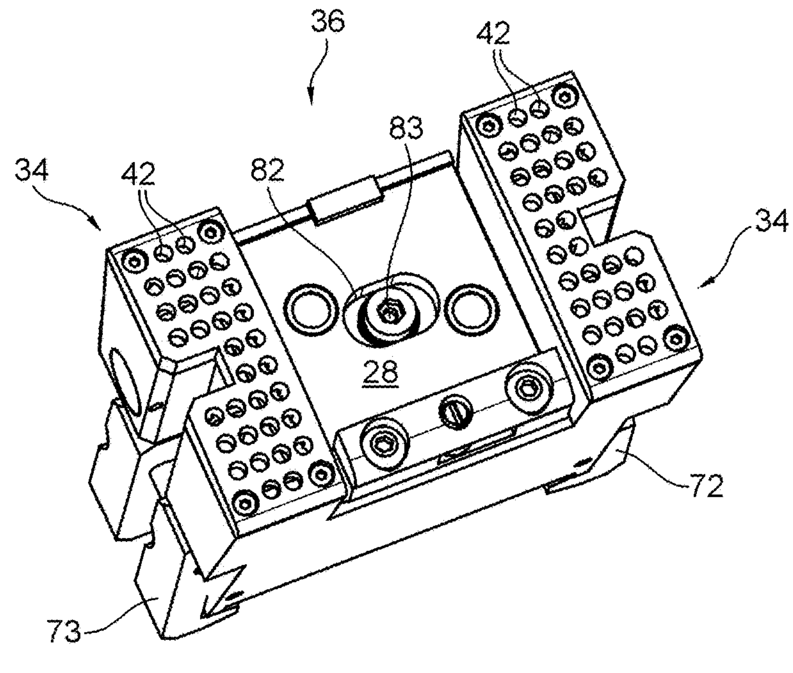
FIG. 10 a top view of an active unit according to FIG. 9, but without magnet and housing.

In the preferred case of columns that are combined into groups, the magnetic elements 24 can be arranged or arrangeable, directly or indirectly, in or at multiple, for example a number m of, for example, four to eight, in particular five to seven, for example six, preferably ring-like carrier elements 31, for example ring elements 31 here, which are axially spaced apart from one another and preferably an above-described part of which, or preferably all of which, can be positioned in the axial direction on a cylinder body 32, in particular an axially extending shaft 32, wherein in turn in each case multiple, for example two to twelve, advantageously five to ten, magnetic elements 24 are arranged or can be arranged one behind the other in the circumferential direction in or at these ring elements 31 and at least some of which, or all of which, are arranged or can be arranged so as to be positionable in the circumferential direction (see, for example, FIG. 4 and FIG. 5).

For the case of a web-format substrate 02, the magnetic cylinder 26 can be designed without any holding means acting on the substrate 02 and, for example, with ring elements 31 that are closed in the circumferential direction. For the case of sheet-format substrate 02 preferred here, holding means 33, for example grippers 33 of a so-called gripper bar, are provided around the circumference of the cylinder 26, by which a substrate sheet 02 to be conveyed over the cylinder 26 can be picked up at the leading end thereof, and can be held or is held during a rotation of the cylinder 26 over an angular range, in particular a rotation angle range. A magnetic cylinder 26 configured in this way at the same time serves to transport the substrate 02. For example, the ring elements 31 are, for example as is apparent in FIG. 4 and FIG. 5, interrupted in the circumferential direction to receive the holding means 33. Unless an explicit distinction is made, the term "ring-like" carrier elements or "ring elements" here shall also include non-closed, that is, ring segment-like, elements. In FIG. 5, any fastening means used for fastening, as shown, for example, in connection with an embodiment example according to FIG. 15 to FIG. 18 and also applicable to the embodiments from FIG. 1 to FIG. 14, are not shown further.

In a particularly advantageous embodiment of the magnetic cylinder 26, individual modular units 36, which are positioned or can be positioned on or in the cylinder body 29 in a matrix-like manner in columns and rows in the above sense, are provided for multiple or all magnetic elements 24, hereafter also referred to as active units 36, in particular magnetic unit 36, which each comprise both at least one magnetic element 24 and at least one suction element 34.

In a particularly preferable embodiment of the device 07 for aligning magnetic or magnetizable particles P, in several, preferably in all of the m columns of magnetic elements 24, in each case multiple, in particular all of the magnetic elements 24 arranged one behind the other with at least one associated suction element 34 are combined in respective modular units 36 as active units 36 and as such can be positioned as a whole and in each case independently of all other such active units 36 in the circumferential direction and/or can be detached from the cylinder 26.

The active units 36 each comprise a magnetic element carrier 37, on or in which the magnetic element 24 is arranged on its outwardly directed side. The at least one suction element 34 can be integrated as part of the magnetic element carrier 37 or arranged as a separate part thereon. Preferably, the active unit 36, viewed in the axial direction of the cylinder 26, comprises at least one suction element 34 on each side of the magnetic element 24. The respective suction element 34 comprises several suction openings 42 in the surface directed outwards, i.e. towards the outside of the cylinder 26 and/or at the level of the cylinder envelope, which are provided, for example, in a cover element 41 covering a suction air channel 39 (see, for example, FIG. 11) in the suction element 34 and preferably detachably fastened above the suction channel 39. A channel arrangement not apparent in the figures leads from the respective suction air channel 39 through the active unit 36 to a base-side line interface 43, which is formed, for example, by at least one cut-out 43 (see for example FIG. 11) open towards the inside of the cylinder in a base of the active unit 36 facing the inside of the cylinder. Air can be drawn in from the suction openings 42 connected via the channel arrangement and the suction air channel 39 through this at least one cut-out 43 or the line interface 43 formed here thereby and assigned to the active unit 36.

In an embodiment not shown, the active units 36 can in principle be arranged or arrangeable in a matrix-like manner directly or indirectly on a for example outer cylindrical surface 44 of the axially extending cylinder inner body 32, in particular the shaft 32. This cylinder inner body or shaft has, for example, on a longitudinal section which indirectly or directly carries the magnetic elements 24, radially outwardly directed suction air openings 46 as suction-air guiding line interfaces 46, which have a line connection, for example via radially extending feedthroughs 47, for example bore holes 47, with a channel 48, for example suction air channel 48, which extends, for example, axially in the shaft 32 and is to be supplied with suction air from at least one cylinder end.

In the case that the active units 36 are arranged or are to be arranged in a matrix-like manner directly, i.e. directly on the above-mentioned outer cylindrical surface 44 of the axially extending cylinder inner body 32 or the shaft 32, the active units 36 are or are to be positioned on the outer cylindrical surface 44 in such a way that the line interface 43 on the base of the active unit 36, here for example the free cross-section of the above-mentioned cut-out 43 in the base of the respective active unit 36, overlaps with at least one of the line interfaces 43 formed by, for example, suction air openings 46 in the shaft 32. The aforementioned cut-out 43 forms here, for example, a chamber 43 delimited on the base side by the outer cylindrical surface 44, wherein a wall in the base area of the active unit 36 completely surrounding the cut-out 43 and an opposite area of the outer cylindrical surface 44 of the shaft 32 form a sealing surface sealing the chamber 43 all around. In this embodiment, the air is drawn in from the suction openings 42 in the relevant suction element 34 via the suction air channel 39 and the channel arrangement, via the line interface 43 of the active unit 36 formed, for example, by the cut-out 43 and at least one suction air opening 46 of the cylinder inner body 32 as well as the suction air channel 48. For such an embodiment, suitable fastening means, for example in the form of clamping or screw connections, must be provided by which the respective active unit 36 can be fixed to the outer cylindrical surface 44.

In the particularly advantageous embodiment shown here, however, the active units 36 are not arranged or arrangeable directly on the section of the cylinder inner body 32 or the shaft 32 having the suction air openings 46, but rather multiple or preferably all of the active units 36 provided for a respective column are arranged as a group at or on an above-mentioned, in particular ring-like carrier element 31, for example ring element 31, wherein advantageously at least the outermost carrier elements 31 on both sides, but preferably all of the carrier elements 31 carrying the respective group or column of active units 36, can be varied in their axial position on the cylinder inner body 32 or the shaft 32.

The preferably ring-like carrier elements 31 or ring elements 31 each have line interfaces 49; 51 assigned to the respective carrier element 31 on the side facing inwards, i.e. in the assembled state pointing towards the cylinder inner body 32 or the shaft 32, and on a side facing outwards, as well as a channel arrangement which connects one or more of the line interfaces 49 on the inside to one or more of the line interfaces 51 on the outside for conducting through suction air. On the inside, for example, cut-outs 49 are provided as line interfaces 49 in a wall 52 pointing in the direction of the inside of the cylinder, which each have a line connection via one or more channels 53 extending in the ring element 31 to feedthroughs 54, for example boreholes 54, which lead through the carrier element 31 to line interfaces 51 on the outside and extend radially, for example. Although the openings of individual boreholes 54 could also simultaneously represent the outwardly effective line interfaces 51, preferably one or in particular several of the boreholes 54 also lead on the outside into a cut-out 51 in the outwardly facing wall 56 of the carrier element 31, for example forming the outer line interface 51.

The ring elements 31 are or will be positioned, for example, on the outer cylindrical surface 44, in particular in such a way that respective or the respective line interfaces 49 on the inside of the ring element 31, here for example the free cross-section of the above-mentioned cut-out 49, overlap with at least one of the suction air openings 46 in the shaft 32 or the cylinder inner body 32. In this case, the above-mentioned cut-out 49 forms, for example, a chamber 49 delimited on the bottom side by the outer cylindrical surface 44, wherein a surface, located outside the cut-out 49, of the inwardly facing wall 52 of the ring element 31 on the inwardly facing side of the ring element 31 forms a sealing surface with an opposite region of the outer cylindrical surface 44 which seals the chamber 49. Similarly, for example, the active units 36 are or will be positioned in particular on the outward-facing side of the ring element 31 such that the line interface 43 on the base of the active unit 36, here for example the free cross-section of the above-mentioned cut-out 43 in the base of the respective active unit 36, overlaps with at least one of the outer line interfaces 51 on the outward-facing side of the ring element 31. In this case, the cut-out 43 forms, for example, a chamber 43 delimited on the bottom side by the outer wall 56, with the wall completely surrounding the cut-out 43 in the base area of the active unit 36 forming a sealing surface with an opposite region of the wall 56 of the carrier element 31 which seals the chamber 43. In this embodiment, the air is drawn in by the suction openings 42 in the relevant suction element 34 via the suction air channel 39 and the channel arrangement, for example via the line interfaces 43; 51 formed by the overlapping cut-outs 43 and 51, the channel arrangement of the ring element 31, the line interface 49 formed, for example, by the cut-out 49 on the inner side of the ring, and at least one suction air opening 46 as well as the suction air channel 48 and, for example, via a rotary union, from a suction air source located outside of the cylinder 26.

The respective pattern of the suction air openings 46 or line interfaces 46 on the cylinder inner body 32 and the position and shape of the cooperating line interface(s) 43 or cut-out(s) 43 in the base area of the active unit 36 in conjunction with the first above-mentioned variant (without carrier element 31) are preferably matched to one another such that continuous positioning of the active unit 36 in the circumferential direction across at least one adjustment range of two suction air openings 46 spaced apart from one another in the circumferential direction on the shaft 32 is made possible in that in the first variant, at least one of the suction air openings 46 or line interfaces 46 is completely covered by the underside of the active unit 36 in each position located in the relevant adjustment range, while at the same time the opening cross-section of the at least one suction air opening 46 or line interface 46 at least partially overlaps with the bottom-side line interface 43 or cut-out 43 of the active unit 36.

The respective pattern of the suction air openings 46 or line interfaces 46 on the cylinder inner body 32 and the position and shape of the cooperating line interface(s) 49 or cut-out(s) 49 on the inside of the carrier element 31 as well as the position and shape of the cooperating line interfaces 51; 43 or cut-out(s) 51; 43 on the outer side of the carrier element 31 on the one hand and in the base area of the active unit 36 on the other hand in conjunction with the second variant (comprising the carrier elements 31) are preferably matched to one another such that continuous positioning of the active unit 36 in the second variant in the circumferential direction is possible over an adjustment range of at least two line interfaces 51 or cut-outs 51 on the outside of the carrier element 31, in that at least one line interface 51 or cut-out 51 on the outside of the carrier element 31 is completely covered by the underside of the active unit 36, while at the same time the opening cross-section of the at least one line interface 51 or cut-out 51 on the outside of the carrier element 31 at least partially overlaps with the bottom-side line interface 43 or cut-out 43 of the active unit 36.

In connection with a variable positioning, in a particularly advantageous refinement, line interfaces 46; 51 are provided at more points in the axial direction of the cylinder inner body 32 and/or in the circumferential direction on the carrier elements 31 than would be necessary for a single specific configuration for normal operation. However, in order to prevent secondary air from being drawn in through these line interfaces 46; 51 not covered by active units 36 or ring elements 31, closing means 57; 58 are provided, by means of which feedthroughs 47; 54 on the cylinder inner body 32 and/or on the outer circumference of the carrier element 31 supplying line interfaces 46; 51 not covered by the active units 36 or the carrier elements 31 can be selectively closed. In the simplest case, this can be a type of plug which is inserted into the relevant feedthroughs 47; 54 for closing and removed from them again as required.

Preferably, however, closing means 57; 58, for example in the form of valves 57; 58, are provided in the selectively closable feedthroughs 47 or 54, which are or can be brought into a closed position in feedthroughs 47 or 54 by feedthroughs 47 or 54 that are not or only partially directly covered by active units 36 or by carrier elements 31, while at least some of the feedthroughs 47 or 54 are or can be brought into a passage position by line interfaces 46; 51 that are completely covered by active units 36 or by carrier elements 31.

A preferable embodiment of such a closing means 57; 58 is designed in the form of a valve 57; 58, which can be brought selectively into a passage position and into a closing position, without requiring removal or insertion. In an advantageous embodiment, the feedthroughs 47; 54, which are designed in particular as boreholes 47; 54, only have a line connection on one side of the clear cross-section with the channels 48 or 53 of the cylinder inner body 32 or of the carrier element 31, which adjoin on the suction side. For example, in a particularly advantageous embodiment, the valve 57; 58 is formed by a sleeve 57; 58, which on one side has a recess 61 in the lateral wall 62 which, in a rotational position representing a passage position, opens the path into the channel 48; 53 adjoining on the suction side in the cylinder inner body 32 or in the carrier element 31, while in another rotational position it interrupts the connection to the relevant channel 47; 54 by the sleeve wall. In an advantageous embodiment, the sleeve-like valve 57; 58 has, for example at least in a section located further to the outside in the assembled state, an actuating interface 63 which can be brought into engagement with a tool 59 and via which the valve 57; 58 can be rotated between the passage position and the closing position by the corresponding tool 59, in particular without it having to be removed. The corresponding tool interface pair 59, 63 used here is, for example, a polygonal wrench 59 and an inner circumferential section 63 in the sleeve 57; 58 in the form of a polygonal socket 63.

In a refinement of the cylinder 26, a support element 66 is provided between each two columns or groups of modular or active units 36, which has a support surface 67; 68 at the level of the cylinder envelope for supporting the substrate 02 conveyed over the cylinder 26. The support surface 67 can be the outwardly directed cylindrical surface 67 of a circular ring-shaped support disk 64 or the outwardly directed surface 68 of a support plate 71 arranged on a support disk 69, for example made of plastic or metal. The term "circular ring-shaped" shall also include a support disk 69 that is not completely closed in the circumference, i.e. circular ring segment-like.

In a particularly advantageous embodiment for the fastening of magnetic elements 24 on the cylinder 26, wherein multiple or all magnetic elements 24 of a group are mounted at or on a shared, ring-like carrier element 31 and can be positioned on the carrier element 31 in the circumferential direction, the magnetic elements 24 or a magnetic element carrier 37 supporting the magnetic elements 24 each comprise at least one clamping element 72; 73, for example a clamping lever 72; 73, on both sides when viewed in the axial direction, for example a clamping lever 72; 73, whose ends effective for clamping each engage under a stop surface 74; 77 that, in the assembled state, extends in the circumferential direction on the respective end face of the ring-like carrier element 31 and is directed inwards, i.e. with its surface normal pointing into a cylinder interior, and/or counteracts a radial removal of the magnetic element 24 or magnetic element carrier 37 by cooperation with the clamping element 72; 73 situated in the clamping position. In a particularly advantageous embodiment, this stop surface 74; 77 can be an inwardly directed surface of a groove 76; 78 extending in the circumferential direction on the end face of the carrier element 31, into which the clamping element 72; 73 engages with its effective, for example claw-like or clamp-like end. Here, the stop surface 74; 77 or groove 76; 78 extending in the circumferential direction shall encompass a stop surface 74; 77 or groove 76; 78 which is preferably continuous over the full angular range or circumference or, as shown, the relevant arcuate section, as well as a stop surface 74; 77 or groove 76; 78 which may be interrupted and continues in several arcuate sections. However, the latter can limit the variability of positioning in the circumferential direction. In addition to the surfaces pointing strictly radially inwards, an "inwardly" directed surface is also to be understood here as surfaces inclined in this direction, the surface vector of which is directed into the interior of the cylinder, but preferably as a circumferential surface per end face focused on the same point on the cylinder axis line, thereby providing the clamping element 72; 73 with a stop directed against a radial removal. In an advantageous variant embodiment, in particular to increase the stability of the seat, two clamping elements 72; 73 that are spaced apart from one another in the circumferential direction or one clamping element 72; 73 comprising two claws cooperating with the carrier element 31 and spaced apart from one another are provided on each side.

Even if the clamping element 72; 73 could basically also be designed as a one-armed lever 72; 73, it is preferably designed in the form of a two-armed lever 72; 73 which can be pivoted about an axis 81, for example pivot axis 81, mounted on the magnetic element 24 or its mount 28 or a modular unit 36 comprising the magnetic element 24, the lever arm of which located closer to the center of the cylinder comprises the part which cooperates with the stop surface 74; 77, for example the claw-shaped or clamp-shaped part, and the lever arm of which located further to the outside is used for actuation. In a preferred manner, the clamping element 72; 73 is preloaded in a self-locking manner, for example by a spring element 79, in particular a compression spring 79, acting between the lever 72; 73, in particular the lever arm located further to the outside, and the magnetic element 24 or the mount 28 or the modular unit 36, in such a way that, in the idle position, i.e. without actuation, it is in the clamping position and holds the magnetic element 24 or the mount 38 or the modular unit 36 on the carrier element 31. The described fastening means offers particular advantages together with a mounting aid 97 described in more detail below.

The above-mentioned type of fastening with the above-mentioned fastening means 72; 73, 74, 77 is basically independent of, but advantageous in conjunction with the design of the above-mentioned modular units 36, in particular active units 36, and/or the special type of suction air guidance or supply and/or of an axial mobility of individual magnetic elements 24, which is described in more detail below, and/or of a mobility of individual magnetic elements 24 in the circumferential direction, which is described in more detail below. The clamping elements 72; 73 make it possible to release the connection from the outside without having to remove the relevant magnetic element 24. Due to continuous adjustability, a release can take place just to the extent that the relevant magnetic element 24 can be positioned in the circumferential direction against any remaining frictional forces, but without, for example, the risk of tilting, slipping, or falling off.

Figure 11:
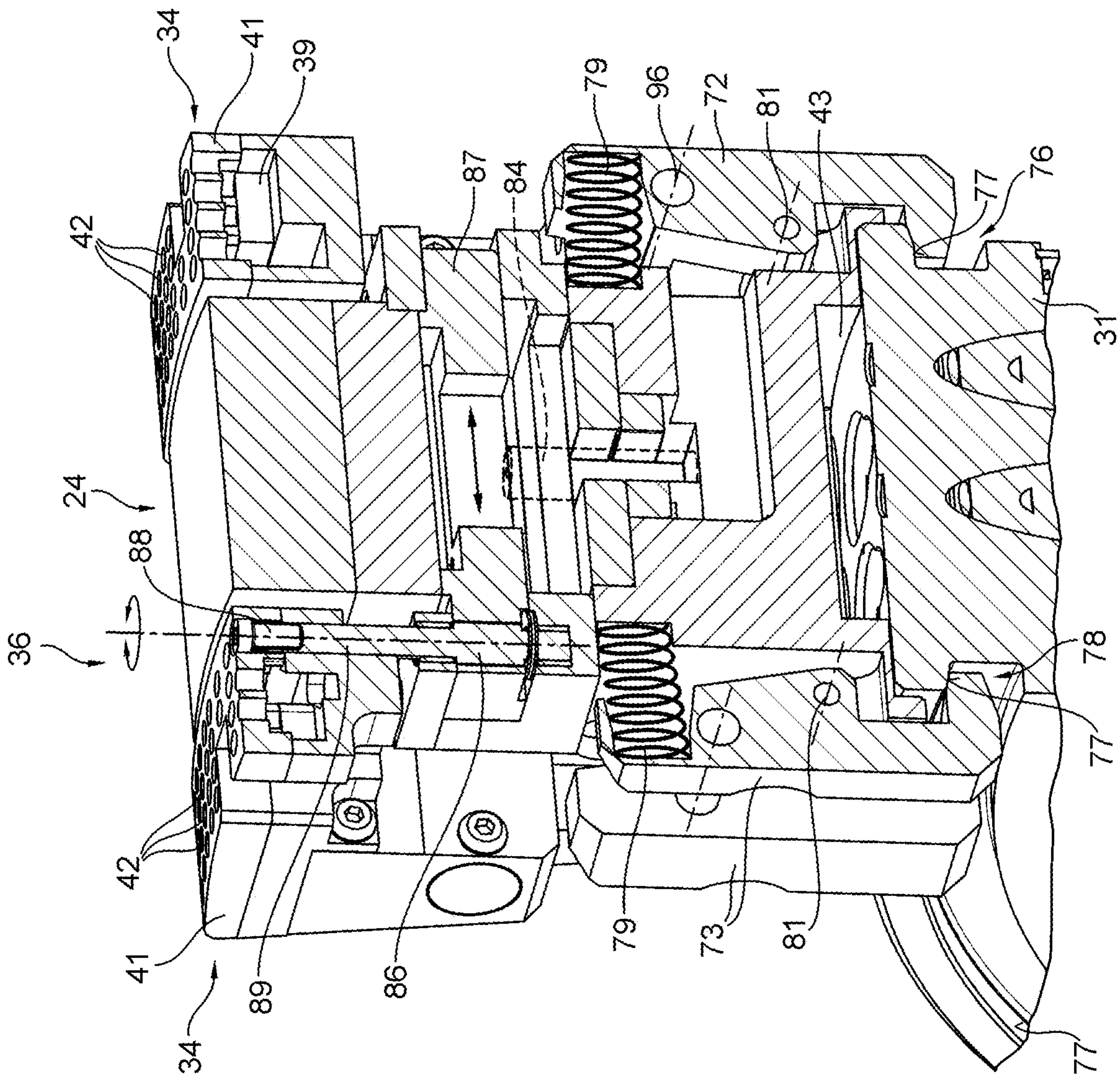
FIG. 11 a sectional view of an exemplary embodiment of an active unit comprising a magnetic element and a suction element with a recognizable adjusting mechanism for axial positioning of the magnetic element.
Figure 12:
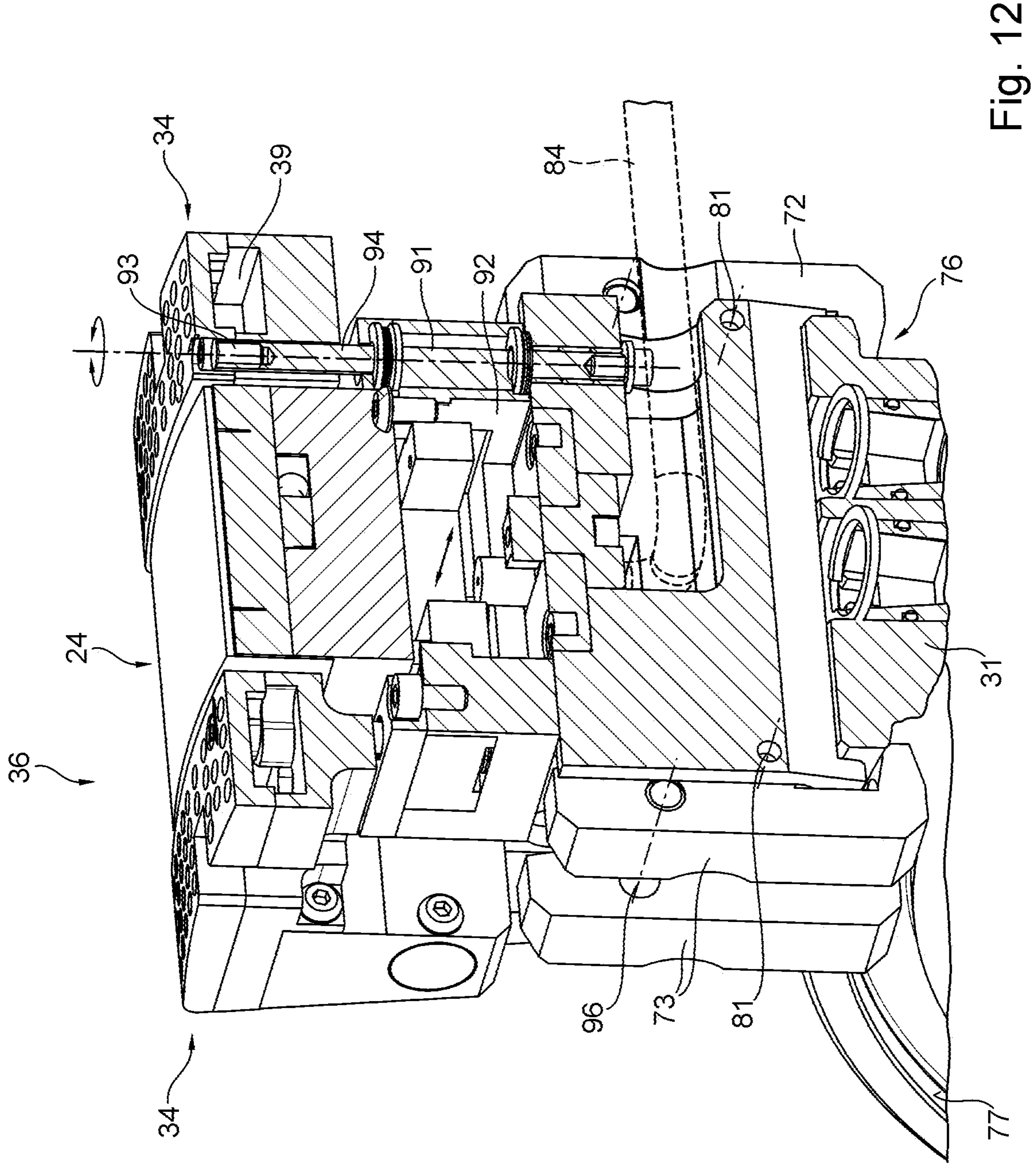
FIG. 12 a sectional view of an exemplary embodiment of an active unit comprising a magnetic element and a suction element with a recognizable adjusting mechanism for positioning the magnetic element in the circumferential direction.
Figure 13:
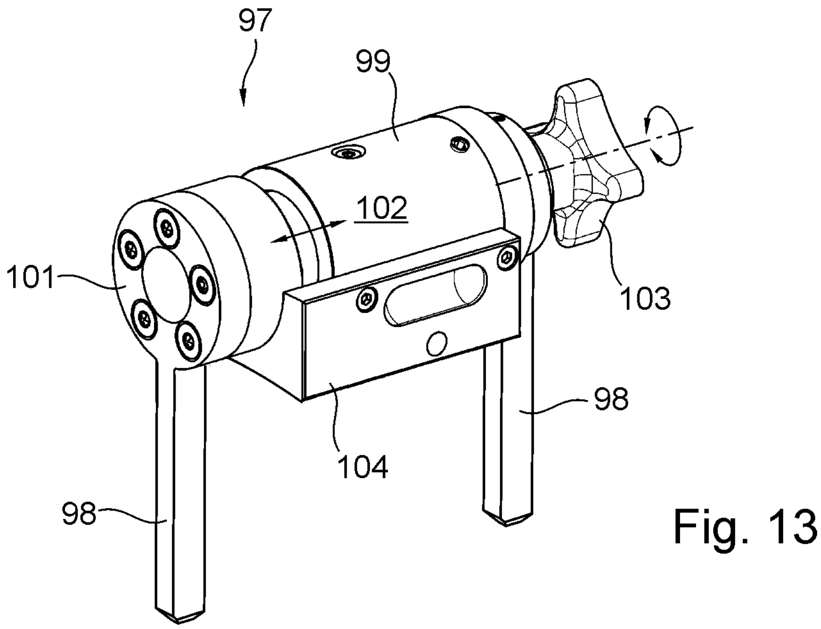
FIG. 13 a perspective view of an assembly aid for attaching or removing and/or positioning an active unit.
Figure 14:
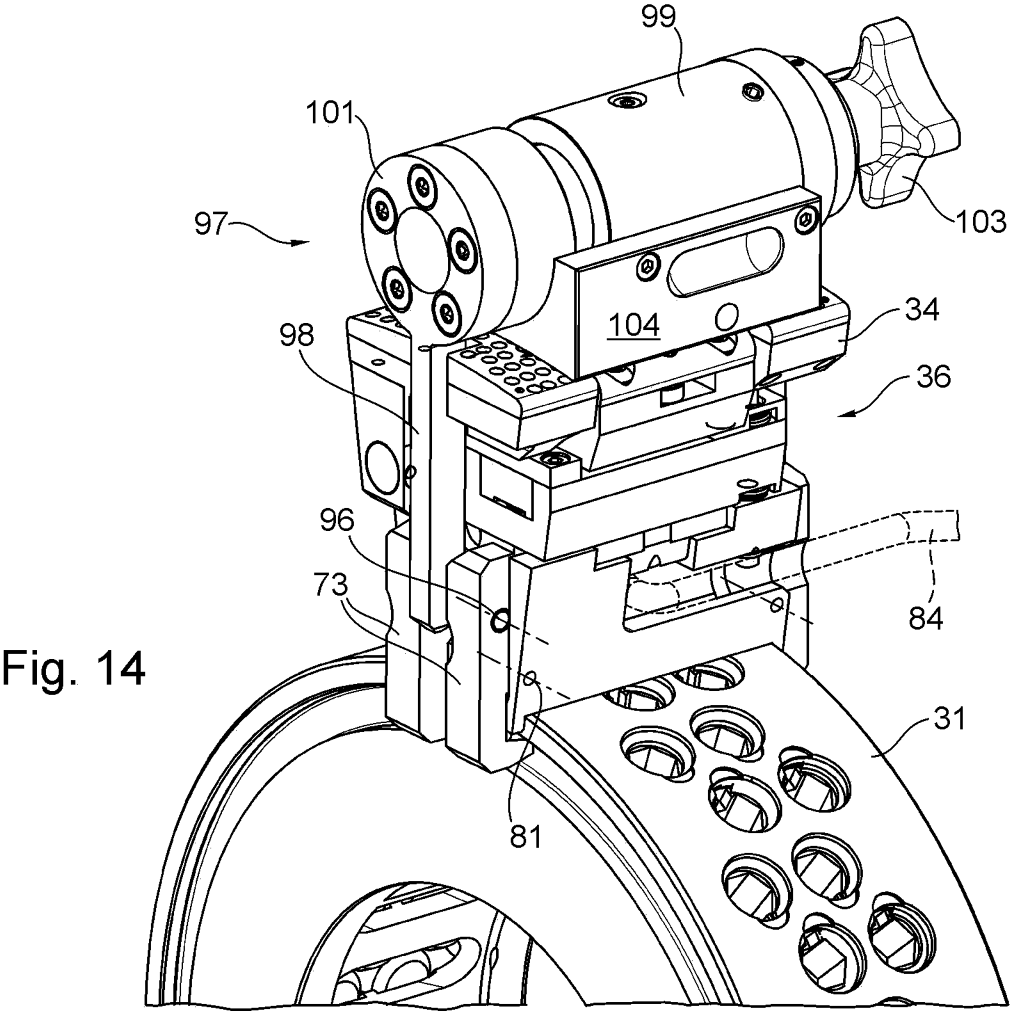
FIG. 14 a perspective representation of an active unit arranged on a ring element with the mounting aid from FIG. 13 attached.
Figure 15:
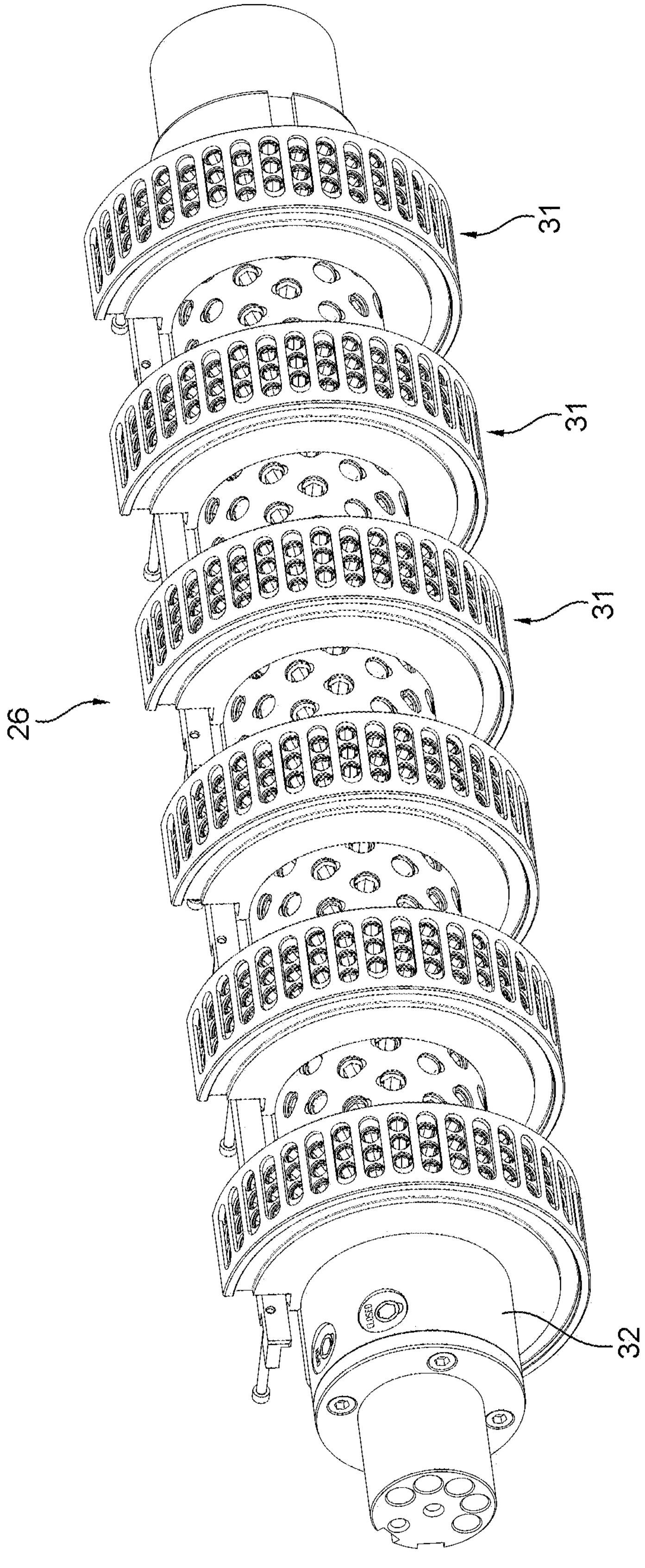
FIG. 15 a perspective representation of a cylinder inner body fitted with six ring elements.
Figure 16:
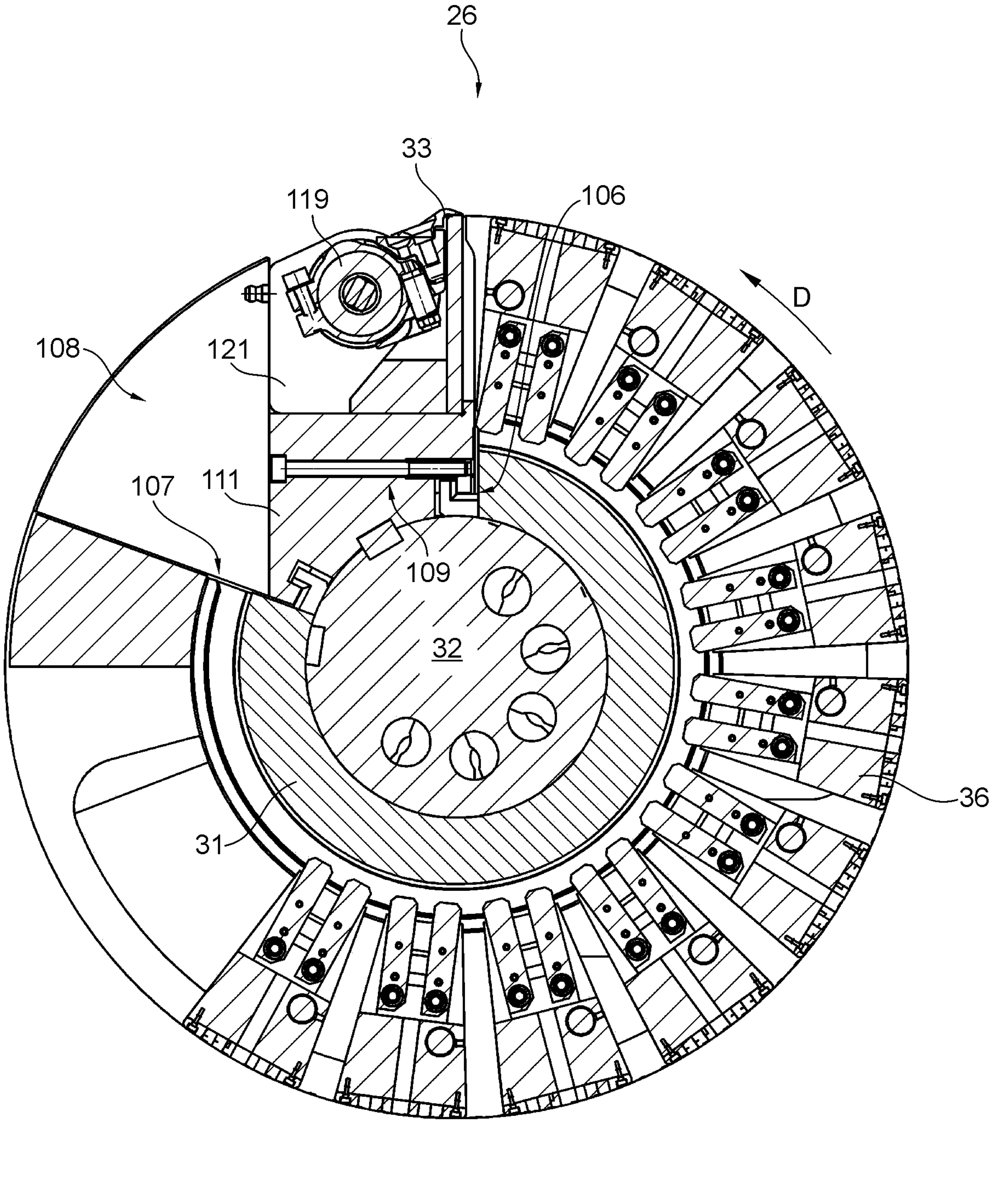
FIG. 16 a cross-sectional representation of a cylinder with a cylinder inner body, a ring segment-like carrier element arranged thereon and, by way of example, ten active units arranged on the latter.
Figure 17:
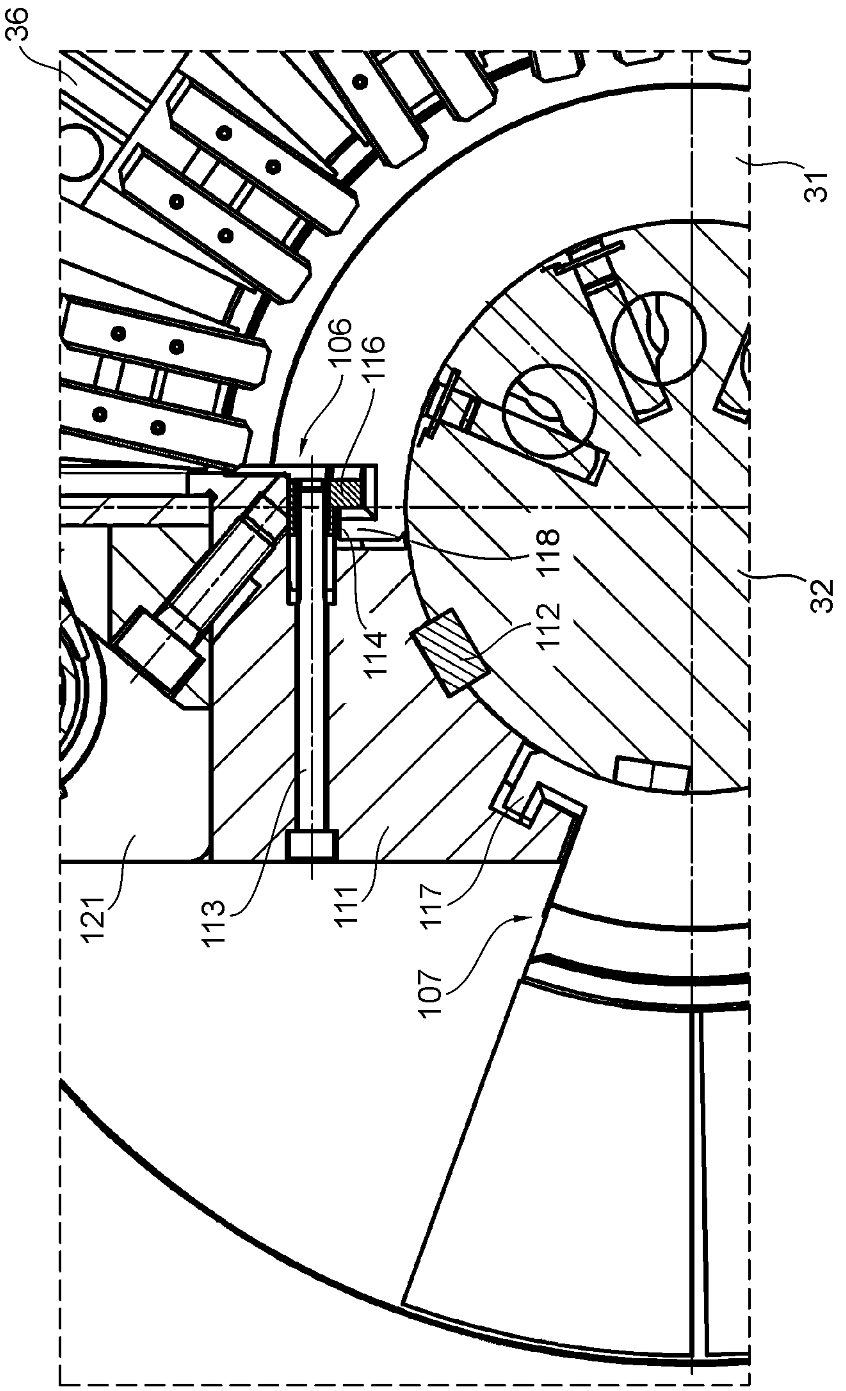
FIG. 17 an enlarged section of the fastening device for the carrier element.
Figure 18:
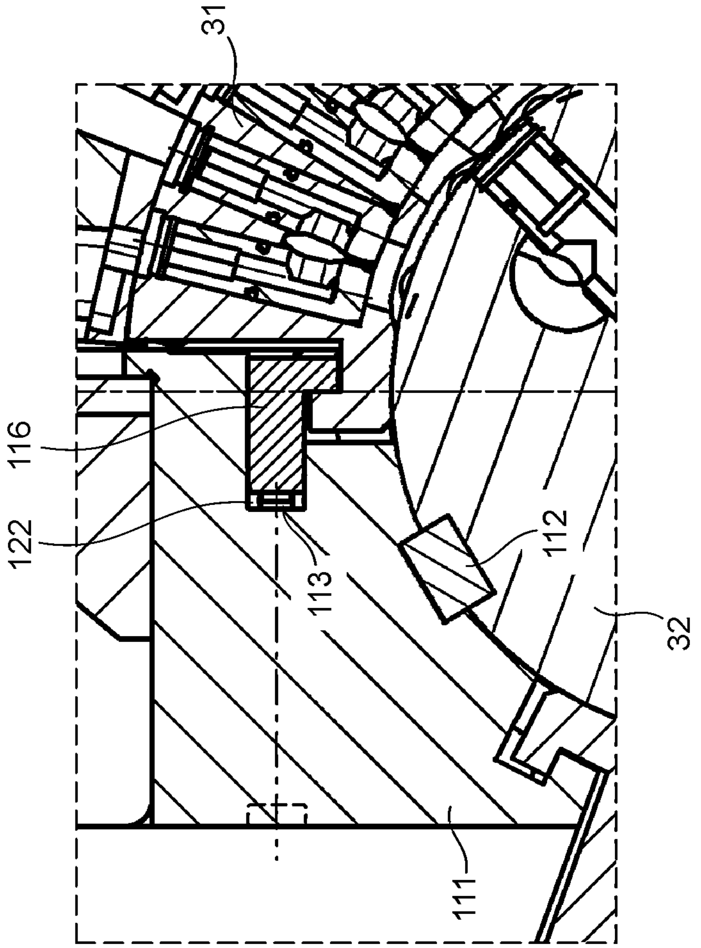
FIG. 18 a section showing a detail of the fastening device for the carrier element.

In some of the figures, for example FIGS. 11, 12 and 14, an optionally provided line 84 is shown or indicated which, in the event that the magnet 27 in the magnetic element 24 is designed to be rotatable by a motor, supplies the motor with signals and/or with electrical energy.

As was already described above in connection with FIG. 2 and FIG. 3, the respective column of image-producing print motifs 18 extending in the circumferential direction of the forme cylinder 14 relates to the same column of multiple-ups 09 provided, or to be provided, one behind the other on the substrate 02. Ideally, these multiple-ups 09 are aligned with one another along the transport direction T and have a uniform width. In cases deviating therefrom, for example when, during an upstream process or due to other mechanical or physical loading, a trapezoidal deformation of the substrate 02 possibly printed previously in the pattern of the multiple-ups 09 has taken place, a geometry that has been changed in this way can be countered by an accordingly varied arrangement of the print motifs 18 on the forme cylinder 14. The print motifs 18 of individual columns are then, for example, not strictly aligned with one another in the circumferential direction, but are located, for example, partially on helical lines that are slightly inclined in relation to the circumferential line (shown, for example, in an exaggerated illustration in FIG. 3 for better perception). The width of the multiple-ups 09 on the substrate 02 increases, for example, from the leading to the trailing end of the substrate section or substrate sheet 02 or, for example with appropriate reverse infeed at the entrance of the printing machine 01, possibly in the opposite direction. However, there may also be other reasons for a deviation in the relative position between the axial position of individual magnetic elements 24 and the target position for their effect on the substrate 02, such as, for example, a slightly incorrect axial positioning of the magnetic elements 24 on the cylinder 26, etc.

In principle, irrespective of an arrangement of the magnetic element 24 in an above-mentioned modular unit 36 and/or of the design of an above-mentioned fastening device and/or of adjustability in the circumferential direction, but preferably in conjunction with one or more of the described advantageous embodiments, in a particularly advantageous embodiment at least in multiple, preferably in all of the columns or groups of magnetic elements 24 extending in the circumferential direction, in each case at least one of the magnetic elements 24 is mounted directly or indirectly on the cylinder body 29 of the magnetic cylinder 26 so as to be adjustable or movable at least in the axial direction independently of at least one other magnetic element 24 of the same column or group. Preferably, multiple, advantageously all except one, in particular advantageously, however, all magnetic elements 24 of the same group are mounted so as to be axially movable, independently of other magnetic elements 24 of the group, and/or multiple, advantageously all except one, or all magnetic elements 24 of at least the two groups, in particular all columns or groups, of at least three columns or groups that are closest to the end face are mounted so as to be axially movable in or at the cylinder body 29, independently of other magnetic elements 24 of the particular column or group. This allows the above-mentioned random or systematic relative deviations of individual magnetic elements 24 in the axial position to be readjusted or corrected. In particular in conjunction with the above-mentioned indirect mounting of the magnetic elements 24 via magnetic element carriers 37, which are provided directly or indirectly on the cylinder body 29 via the above-mentioned carrier elements 31, such axially adjustable magnetic elements 24 are preferably axially adjustable at the relevant magnetic element carrier 37 and relative thereto. Instead or preferably in addition, multiple or all of the magnetic elements 24 can be individually adjustable on the cylinder body 29 or in particular a magnetic element carrier 37.

In a particularly advantageous embodiment of the cylinder 26 with the n×m magnetic elements 24 arranged in a matrix-like manner, at least two or all of the magnetic elements 24 provided in the same column one behind the other are mounted at or on an above-mentioned shared carrier element 31 and can be varied together with the same and independently of an adjacent group with regard to their axial position in or on the cylinder 26, wherein in addition the at least two or preferably all magnetic elements 24 of this or preferably each column are arranged on respective magnetic element carriers 37, which can be positioned independently of one another in the circumferential direction on the shared carrier element 31 and/or can be detached from the carrier element 31 and are mounted on the relevant magnetic element carrier 37 so as to be adjustable in the axial direction within an adjustment range, for example, of at least 1 mm in total, preferably at least 2 mm.

In this embodiment, the axially movable magnet 27 or the mount 28 is thus supported indirectly via the associated magnetic element carrier 37, which carries the respective, at least axially movable magnetic element 24 and is preferably itself variably positionable on the ring element 31 in the circumferential direction.

In a simple and less complex embodiment (see for example FIG. 10), the respective magnetic element 24 or the mount 28 is fastened in or on the magnetic element carrier 37 or its mount 28 by means of a fastening means 83, for example a screw 83, in such a way that after at least partial loosening of the fastening, for example by at least partial loosening of the screw 83 by means of an appropriate tool, the magnetic element 24 or the mount 28 is released to such an extent that it can be moved axially, at least within a relevant adjustment range on the magnetic element carrier 37. The fastening means 83, for example in the form of a screw 83, is accessible, for example, through a cut-out in the form of an elongated hole 82 in a base area of the mount 28 receiving the magnetic element 24 after removal of the magnetic element 24.

However, a movement or adjustment of the magnetic element 24 or of the mount 28 encompassed by it in the axial direction is preferably carried out, in contrast, for example, to a purely manual and/or tool-free movement, via mechanical adjusting means 86, 87, 89, in particular comprising a gear.

Although the adjusting means 86, 87, 89 effecting an axial movement can be realized by any suitable mechanisms or gears, in the illustrated and particularly advantageous case these comprise a gear converting, for example directly or indirectly, a rotational movement, in particular on the input side, into a linear movement, in particular of the magnetic element 24 or of the mount 28 carrying the magnetic element 24, in particular an eccentric drive which converts a rotational movement of an eccentric 86, for example formed by an eccentrically mounted shaft section 86, into a linear movement, extending axially here, of a slide 87, for example of a support element 87 directly or indirectly carrying the magnetic element 24 or its mount 28, which is directly or indirectly operatively connected via a contact with the effective surface on the eccentric jacket side and is mounted linearly movably in or on the magnetic element carrier 37. The eccentric 86 preferably extends with its axis of rotation radial to the cylinder 26 and/or can be actuated directly or indirectly from the outwardly facing cylinder side. For this purpose, for example, a shaft 89 surrounding the eccentric 86 or continuing outwards has an actuating interface 88, for example a polygonal socket 88, in the region of its outwardly pointing end, which can be actuated, in particular pivoted, by means of a corresponding tool, here for example a polygonal wrench. As an alternative to the eccentric 86 positioned radially with the axis of rotation, a tangential position or a position parallel to the tangent is also conceivable, wherein the eccentric can then be actuated, for example, from a side pointing in the circumferential direction or via an angle gear from the outside.

An adjustment range in the axial direction, as viewed from a center position, is, for example, at least ±1.0 mm (i.e., a total adjustment travel of at least 2 mm), preferably at least ±1.2 mm, for example ±1.5 mm.

In the above embodiment as an active unit 36 comprising at least one suction element 34, in one variant embodiment the at least one suction element 34 can be axially movable together with the magnetic element 24 on the magnetic element carrier 37. A corresponding suction air feedthrough, for example via relative movable sealing surfaces or a flexible line, must be provided.

There may also be deviations in the relative position between the position of individual magnetic elements 24 in the circumferential direction of the cylinder 26 and the target position for their action on the substrate 02 in the transport direction T, which may have a wide variety of reasons, such as, for example, limited options for rough and/or manual pre-positioning on the cylinder body 29 or, in particular, on a carrier element 31 that may be provided.

In principle, irrespective of the arrangement of the magnetic element 24 in an above-mentioned modular unit 36 and/or of the design of an above-mentioned fastening device and/or an above-mentioned adjustability in axial direction, but preferably in conjunction with one or more of the aforementioned advantageous embodiments, in a particularly advantageous embodiment, at least in several, preferably in all axially extending rows of magnetic elements 24, at least one of the magnetic elements 24 is mounted directly or indirectly on the cylinder body 29 of the magnetic cylinder 26 so as to be adjustable or movable at least in the circumferential direction independently of at least one further magnetic element 24 of the same row. Preferably, in multiple, in particular all, rows, multiple, advantageously at least all but one, in particular advantageously, however, all magnetic elements 24 of the same row are mounted so as to be axially movable independently of other magnetic elements 24 of the row.

Instead of or in addition, in a particularly advantageous embodiment of the cylinder 26 with the magnetic elements 24 arranged in a matrix-like manner, at least two magnetic elements 24 provided one behind the other in the same column are arranged on or in magnetic element carriers 37 which differ from one another and can be positioned independently of one another in the circumferential direction on the cylinder 26, wherein the at least two, in particular all, magnetic elements 24 arranged on the respective magnetic element carriers 37 are mounted so as to be adjustable relative to the magnetic element carrier 37 carrying the magnetic element 24 in the circumferential direction within an adjustment range, for example of at least 1 mm in total, preferably at least 2 mm. This preferably applies to at least two or all magnetic elements 24 of all columns.

A movement or adjustment of the magnetic element 24 or of the mount 28 encompassed by it in the circumferential direction is preferably carried out here, in contrast, for example, to a purely manual and/or tool-free movement, via mechanical adjusting means 91, 92, 94, in particular comprising a gear.

In addition to a movement on a circular arc-like path, an adjustment or adjusting movement in the circumferential direction in the present meaning shall also explicitly include a movement along a linear movement path extending tangentially or parallel to the tangent on the circumference, over the relevant adjustment range. As this is generally a very small relevant adjustment range compared to the cylinder diameter, the linear adjustment path does not generally lead to impermissibly large imaging errors.

Although the adjusting means 91, 92, 94 effecting a movement in the circumferential direction can be realized by any suitable mechanisms or gears, in the illustrated and particularly advantageous case these comprise a gear converting, for example directly or indirectly, a rotational movement, in particular on the input side, into a linear movement, in particular of the magnetic element 24 or of the mount 28 carrying the magnetic element 24, in particular an eccentric drive which converts a rotational movement of an eccentric 91, for example formed by an eccentrically mounted shaft section 91, into a linear movement of a slide 92, for example a support element 92 directly or indirectly carrying the magnetic element 24 or its mount 28, which is directly or indirectly operatively connected via a contact with the effective surface on the eccentric jacket side and is mounted linearly movably in or on the magnetic element carrier 37. In the above sense, the linear movement shall be both a rectilinear movement, which is preferable because of the complexity involved, but also possibly a movement on a circular arc. The eccentric 91 preferably extends with its axis of rotation radially to the cylinder 26 and/or can be actuated from the outward-facing cylinder side. For this purpose, for example, a shaft 94 surrounding the eccentric 91 or continuing outwards has an actuating interface 93, for example a polygonal socket 93, in the region of its outwardly pointing end, which can be actuated, in particular pivoted, by means of a corresponding tool, here for example a polygonal wrench. As an alternative to the eccentric 91 positioned radially with the axis of rotation, a tangential position or a position parallel to the tangent is also conceivable, wherein the eccentric can then be actuated, for example, from a side pointing in the circumferential direction or via an angle gear from the outside.

An adjustment range in the circumferential direction is, for example, at least ±1.0 mm (i.e., a total adjustment path of at least 2 mm), preferably at least ±1.2 mm, for example ±1.5 mm, when viewed from a central position.

In the above embodiment as an active unit 36 comprising at least one suction element 34, in one variant embodiment the at least one suction element 34 can be movable together with the magnetic element 24 on the magnetic element carrier 37 in the circumferential direction. A corresponding suction air feed-through, for example via relative movable sealing surfaces or a flexible line, must be provided.

In the event that both an axial as well as a circumferential adjustability of the magnetic elements 24 on the respective magnetic element carrier 37 in the circumferential direction is provided, the two slides 87; 92 can be arranged directly or indirectly on top of and/or above one another in the manner of a cross guide.

In one of the above-mentioned embodiments, the relevant magnetic element 24, in a refinement, can be adjusted in the axial and/or circumferential direction by a remotely operable drive means, for example an electric motor driving the eccentric 86; 91, for example via a gear reducer.

Basically independent of an arrangement of the magnetic element 24 in an above-mentioned modular unit 36 and/or of an above-mentioned adjustability in the axial direction and/or of an above-mentioned adjustability in the circumferential direction, but preferably in conjunction with one or more of the advantageous embodiments described above, a mounting aid 97, as was already mentioned above, is provided, which can be placed on the magnetic element 24 or on a magnetic element carrier 37 carrying the magnetic element 24 or a modular unit 36 comprising the magnetic element 24, and by means of which the clamping fit or a clamping connection between the clamping elements 72; 73 on both sides and the carrier element 31 can be released. In a preferred manner, the clamping can be released and opened by the mounting aid 97 or a drive means 102, in particular a manually operable drive means 102, comprised by the mounting aid 97 not only in such a way that the magnetic element 24 or the modular unit 36 comprising it can be removed from the carrier element 31, but can also be released in an intermediate position in the strength or the degree of opening of the clamping to such an extent that the magnetic element 24 or the modular unit 36 is not yet completely free, but can be positioned on the carrier element 31 overall in the circumferential direction. A degree of opening can be adjustable in such a way that although there is still contact between the clamping elements 72; 73, positioning is possible while overcoming any slight frictional forces that may still exist. For this purpose, the actuating arms 98 are preferably continuously positionable by the drive means 102 over an adjustment path between a clamping position, in which the clamping elements 72; 73 develop the full clamping force on the carrier element 31, and a position in which the clamping is released to such an extent that the magnetic element 24 or the magnetic element carrier 37 carrying it can be removed from the carrier element 31.

In order to be able to accomplish a simple actuation from the outside of the cylinder and/or, in particular, also such a defined opening, the assembly aid 97 comprises, in addition to a base 104 which can be placed on the relevant magnetic element 24 or on the relevant modular unit 36, actuating arms 98 on both end faces, which extend in the radial direction to both end faces of the magnetic element 24 or of the modular unit 36 and can be brought or are brought into operative connection with the respective end-face clamping element or elements 72; 73 for their actuation. Furthermore, the assembly aid 97 comprises the above-mentioned drive means 102, in particular a positioning drive 102, by means of which the actuating arms 98 can be brought into a first position in which they open the clamping elements 72;

73—for example against the above-mentioned spring force, to such an extent that the magnetic element 24 or the modular unit 36 can be attached to the carrier element 31 or completely detached therefrom, up to a second position in which the clamping elements 72; 73 develop the full clamping force on the carrier element 31 without the actuating arms 98 absorbing any force that is directed against the clamping force. Preferably, all intermediate positions can be adjusted by the drive.

In the above-mentioned design of the clamping elements 72; 73 as two-armed levers 72; 73, each of the actuating arms 98 engages directly or indirectly on the lever arm located further out and can be moved towards each other by the drive means 102 to open the clamping connection, i.e. in each case in the direction of the carrier element 31, and can be moved apart again to close the clamping connection. In the above-mentioned case of two clamping elements 72; 73 arranged next to each other, these are coupled to each other, for example, via a coupling element 96 connecting the two lever arms located further out, for example, a connecting axis 96 mounted in both outer lever arms, which serves as an engagement point for the respective actuating arm 98, for example simultaneously. In the case of a single clamping element 72; 73, the respective actuating arm 98 can act directly or indirectly on the lever arm of the relevant clamping element 72; 73 located further out.

In principle, any drive mechanism is conceivable as drive means 102, by means of which the two opposing actuating arms 98 can be moved towards and away from each other in the above sense. However, a drive mechanism with a self-locking gear, such as is provided, for example, by a screw drive, is preferred here. The drive means 102 thus comprises, for example, a first part 99 carrying the actuating arm 98 on one side, for example a first bushing 99, and a second drive part 99 carrying the actuating arm 98 on the other side, for example a second bushing 101, which is mounted so as to be non-rotatable but axially movable relative to the first part 99, as well an internally formed screw drive, by means of which the parts carrying the actuating arms 98 can be moved apart and towards each other via a threaded spindle (not shown), which can be rotated for example via a manual actuating interface 103, such as a rotary handle 103, on the one hand, and an internal thread on the other of the two parts 99; 101 of the drive means 102.

In the design of the magnetic cylinder 26 with carrier elements 31, which are variable in their axial position, in particular ring-like carrier elements 31, these axially positionable carrier or ring elements 31 can in principle be fastened in any manner that enables a releasable connection between the respective carrier element 31 and the cylinder inner body 32 and an axial relative movement. In particular, a connection is particularly advantageous in which, in the region of suction-air conducting line interface pairings of line interfaces 46 on the shaft 32 and cooperating line interfaces 49 on the inward-facing wall 52 of the ring element 31, the surfaces surrounding these line interfaces 46; 49 are pressed together by the connection in such a way that they form a sealing surface that is substantially closed to prevent the passage of suction air.

Basically independent of an arrangement of the magnetic element 24 in an above-mentioned modular unit 36 and/or of an above-mentioned adjustability in the axial direction and/or of an above-mentioned adjustability in the circumferential direction and/or of an above-mentioned clamping device for clamping the magnetic elements 24 or mounts 29 or modular units 36, but preferably in conjunction with one or more of the aforementioned advantageous embodiments, a tensioning device is provided for fastening in a preferred embodiment, for the fastening of ring elements 31, by means of which the carrier or ring element 31 can be clamped onto the cylinder inner body 32, which is designed in particular as a shaft 32, in such a way that an aforementioned sealing surface can be formed. It is helpful to design the ring element 31, which is actually circular ring segment-like here, in such a way that an inner diameter of the ring element 31 in the segment angle range is slightly larger, for example 2 to 50 μm, in particular 5 to 20 μm, than an outer diameter of the cylinder inner body 32, which is designed as a shaft 32, in the cooperating angular range.

In the case of a cylinder 26 with magnetic elements 24 arranged in columns, as described above, the magnetic elements 24 of multiple or all columns are provided as a respective group at or on a respective carrier element 31. The respective carrier element 31 is explicitly designed here as a ring segment-like carrier element 31, i.e. interrupted over an angular range, and has a leading and a trailing end 106; 107 with respect to a production direction of rotation D. The production direction of rotation D is defined, for example, by the arrangement of a gripper bar already mentioned above, which has grippers 33 opening and closing during operation at the leading end 106 of the segment-like ring element 31 for receiving a substrate sheet 02. The respective carrier element 31 is releasably arranged on the cylinder inner body 32 encompassed by the cylinder 26 and is variable in its axial position in the released state. In order to now fasten the carrier element 31 in a desired position on the cylinder inner body 32, a tensioning device 108 is or will be provided on the cylinder inner body 32 when the carrier element 31 is mounted on the cylinder inner body 32 in the region between the leading and trailing ends 106; 107 of the ring-segment-like carrier element 31, by means of which the two ends 106; 107, which are spaced apart from one another in the circumferential direction, can be acted upon by a force directed towards one another in the circumferential direction via adjusting means 109 encompassed by the tensioning device 108. As a result, the segment-like ring element 31 is pressed tightly against the circumferential surface of the shaft 32, possibly by a slight elastic deformation, so that a sealing surface as mentioned above is created.

The tensioning device 108 engages in particular at the two ends 106; 107 of the carrier element 31 and can be varied in its length, effective for the engagement on both sides, in the circumferential direction via the adjusting means 109, encompassed by the tensioning device 108.

Preferably, the tensioning device 108 comprises a tensioning strip 111, which is arranged in the region between the leading and trailing ends 106; 107 of the carrier element 31 on the circumference of the cylinder inner body 32 and is secured at least toward one side to prevent a relative movement with respect to the cylinder inner body 32 in the circumferential direction. Preferably, however, the tensioning strip 111 and the cylinder inner body 32 are secured to prevent rotation in the circumferential direction by pairs of stops acting in both directions of rotation. Such securing can be realized, for example, by corresponding deviations of the inner circumferential line of the ring element 31 and the outer circumferential line of the cylinder inner body 32 acting as stop pairs. In an advantageous embodiment shown here, however, such a relative anti-rotation lock device is provided by a so-called fitted element 112, also commonly referred to as a feather key 112, which is anchored, for example, in the outer cylindrical surface of the cylinder inner body 32 and cooperates with a recess, in particular a groove, in the tensioning strip 111 in a fitting manner or vice versa. A fitted element 112 with a correspondingly cooperating recess is advantageous in such a way that simple radial equipping of the cylinder inner body 32 with the tensioning strip 111 is made possible. In addition to the anti-rotation device, fastening means (not shown), for example screws, can be provided by which the tensioning strip 111 can be fastened radially on the cylinder inner body 32.

Preferably, the tensioning strip 111 can then be removed from the cylinder inner body 32 in the relaxed, i.e. force-free, state of the tensioning device 108 immediately or after the above-mentioned fastening means have been loosened with the carrier element 31 still remaining on the cylinder inner body 32 or can be inserted on the cylinder inner body 32 in the region of the interruption when the ring element 31 has already been positioned on the cylinder inner body 32.

In an advantageous embodiment, the tensioning device 108 engages at one of the ends 107; 106, preferably at the trailing end 107, statically, i.e. in a fixed circumferential relative position between the tensioning strip 111 and the relevant end 107; 106, and engages at the other, preferably the leading end 106 via the adjusting means 109 in a distance-variable manner, i.e. in a variable circumferential relative position between the tensioning strip 111 and the relevant other end 106; 107. This means, for example, that with the adjustment, the point of engagement and thus the relevant end 106; 107 can be moved closer to the tensioning strip 111 or, for example by the elastic restoring force in the ring element 31, returned to the initial position.

For static engagement, for example, a positive fit effective in the circumferential direction is provided via a pair of stops effective between the relevant end 107; 106 and the tensioning strip 111. The stop pair 106, 107 is formed, for example, by opposing surfaces of a hook-like projection on the tensioning strip 111 and a hook-like projection 117 engaging the latter in the opposite direction, for example as a hook-in edge 117, at the end 107 of the ring element 31.

In a preferred embodiment, a site of engagement via the adjusting means 109 at the relevant end 106; 107 is straight or at least has a deviation of no more than 5°, viewed in the circumferential direction, at a point at which a tangent lying against the circumference of the cylinder inner body 32 runs parallel to the adjusting direction of the adjusting means 109. This makes it possible in the small adjustment range here that the end 106; 107 pulled by the adjusting means 109 is essentially acted upon tangentially with a force and thus radial deformation is avoided, as may occur due to a direction of force deviating from the tangent.

Although in principle also realizable in other ways, the adjusting means 109 are preferably formed by a threaded drive 113, 114, for example a threaded rod 113 rotatable in the tensioning strip 111, in particular a screw 113, which is to be braced at the tensioning strip 111 and can be actuated manually, for example, and a corresponding thread 114, for example a threaded bushing 114, which is formed directly in the end region of the ring element 31 or preferably in a tensioning means 116 engaging on the ring element 31 and variable in position via the threaded drive 113, 114 in the adjustment direction of the threaded drive 113, 114, with the tensioning means 116 being configured and arranged so as to cooperate with the relevant end 106 via a pair of stops acting in the circumferential direction. The pair of stops is formed, for example, by opposing surfaces of a tensioning means 116 designed as a pull strip 116 and a hook-like projection 118 receiving the pull strip 116, for example as a hook-in edge 118, on the ring element 31.

In an advantageous refinement, viewed in a cross-section extending perpendicular to the cylinder axis, at least one part of the pull strip 116 is lowered into a cut-out 122 or recess 122 in the tensioning strip 111 having a corresponding shape and cross-section in such a way that movement of the tensioning strip 116 along the adjustment direction guided by the recess 122 is ensured.

In principle, a respective tensioning strip 111 and/or a respective associated tensioning means 116 can be provided for each ring element 31 to be fastened. In a preferred embodiment, however, a tensioning strip 111 extending, viewed in the axial direction of the cylinder 26, over multiple or all of the carrier elements 31 arranged on the cylinder inner body 32, and/or a tensioning means 116 extending, viewed in the axial direction of the cylinder 26, over multiple or all of the carrier elements 31 arranged on the cylinder inner body 32, are provided. In this case, there is no longer any need for a fixed numerical or spatial assignment of adjusting means 109 or screw drives 113, 114 to be assigned to a ring element 31. The fastening device can be retained, irrespective of the number and position of the ring elements 31 with which a continuous or possibly split tensioning device 108 cooperates to clamp them. In particular, an above-mentioned tensioning device 108 without a pull strip 116, i.e. with adjusting means 109 engaging directly in the ring element 31, would also be less suitable for continuous positionability, since the possible positions depend on the hole spacing for the threaded rods 113.

The tensioning strip 111 can be arranged and designed in such a way that it simultaneously forms the base support of a single-part or multi-part gripper bar. For example, bearings 121 supporting a gripper shaft 119 are arranged on the tensioning strip 111 forming the base support.

In a preferred embodiment, such a cylinder 26 is an integral part of an above-mentioned machine 01 and/or is particularly advantageous in conjunction with one or more aspects for the adjustability of individual magnetic elements 24 on respective magnetic element carriers 37 in the axial and/or circumferential direction and/or for the formation of above-mentioned active units 36 with respective magnetic and suction elements 24; 34 and/or the clamping of individual magnetic elements 24 or their mounts 28 or magnetic element carriers 37 on the ring element 31.

Although the disclosure herein has been described in language specific to examples of structural features and/or methodological acts, it is to be understood that the subject matter defined in the appended claims is not necessarily limited to the specific features or acts described in the examples. Rather, the specific features and acts are disclosed merely as example forms of implementing the claims.

The invention claimed is:

1. A cylinder (26) for aligning magnetic or magnetizable particles (P) contained in a coating agent (06) on a substrate (02), the cylinder comprising:

in a region of an outer circumference of the cylinder, in a matrix-like manner, a number of n×m (where n and m are integers greater than one) magnetic elements (24) that provide magnetic fields, and which are arranged in n rows extending in an axially parallel manner and in m columns extending in a circumferential direction, and, in the region of the outer circumference, the cylinder further comprising a plurality of suction elements (34) with suction openings (42) pointing outwards, characterized in that each magnetic element (24) is combined with at least one associated suction element (34), of the plurality of suction elements (34), to form a respective modular unit (36) as an active unit (36), and as such, each active unit (36) can be positioned as a whole and independently of all other such active units (36) in the circumferential direction for positioning a plurality of the active units (36) or all of the active units (36) in one or more of the columns extending in the circumferential direction, each of the one or more columns including multiple ones of the active units (36) so that several or all of the multiple active units (36) in each column of the one or more columns are arranged one behind the other, and wherein individual active units (36) can be detached from the cylinder (26).

2. The cylinder according to claim 1, characterized in that the active units (36), on an underside thereof facing into an interior of the cylinder (26), comprise at least one line interface (43), and a cylinder inner body (32), which is comprised by the cylinder (26) and directly or indirectly carries a respective active unit (36) on a circumference thereof, on an outer side thereof comprises a plurality of line interfaces (46) for conducting suction air therethrough.

3. The cylinder according to claim 2, characterized in that the line interfaces (46) on the outer side of the cylinder inner body (32) are formed, or can be formed, by configuring one or more selectively closable feed-throughs (47) to a passage position, and/or are supplied, or can be supplied, from the interior of the cylinder (26) with a suction.

4. The cylinder according to claim 2, characterized in that a carrier element (31), which comprises the plurality of active units (36) on a circumference thereof and is carried by the cylinder inner body (32), on a side facing into the interior of the cylinder (26) comprises a plurality of line interfaces (49) cooperating with a plurality of line interfaces (46) on the cylinder inner body (32) for conducting the suction air therethrough, and, on an outer side, the carrier element (31) comprises a plurality of line interfaces (51) cooperating with respective at least one line interfaces (43) of the active units (36) for conducting the suction air therethrough.

5. The cylinder according to claim 4, characterized in that the plurality of line interfaces (51) on the outer side of the carrier element (31) are formed by, or can be formed by, one or more selectively closable feed-throughs (54) configured to a passage position, and/or are supplied, or can be supplied, from a carrier element interior with a suction and/or that, for a number of line interfaces (51) which are not completely covered by the active units (36) positioned on the carrier element (31), respective feed-throughs (54) joining the relevant line interfaces (51) are configured, or can be configured, to be closed by means of closing means (58) that are removable or can be brought from a closed position into the passage position.

6. The cylinder according to claim 1, characterized in that the several active units (36) or all the active units (36) provided one behind the other in a same column of the one or more columns, or in all of the columns of the one or more columns, are mounted as a group at or on a shared ring-like carrier element (31) so as to be positionable in the circumferential direction.

7. The cylinder according to claim 6, characterized in that the active units (36) mounted at or on the shared ring-like carrier elements (3731) comprise on both sides of the magnetic element (24), viewed in an axial direction of the cylinder (26), at least one respective clamping element (72; 73), whose effective ends, in a mounted state, engage under stop surfaces (74; 77) that extend in the circumferential direction on two end faces of a respective ring-like carrier element (31) and are directed into the interior of the cylinder (26) and/or counteract a radial removal of a respective active unit (36) by cooperation with the at least one respective clamping element (72; 73) situated in a clamping position.

8. The cylinder according to claim 7, characterized in that each stop surface (74; 77) is formed by a surface, directed into the interior of the cylinder (26), of a groove (76; 78) extending in the circumferential direction at the end face in the carrier element (31), into which the at least one respective clamping element (72; 73), formed as a one-armed or two-armed and/or spring-preloaded lever (72; 73), engages with an end thereof which is effective for clamping.

9. The cylinder according to claim 1, characterized in that, for each active unit (36), a respective magnetic element (24) of the magnetic elements (24), includes one or more magnets (27) as well as, viewed in an axial direction of the cylinder (26) on both sides of the magnetic element (24), a respective suction element (34) of the plurality of suction elements (34) is provided.

10. The cylinder according to claim 1, characterized in that the active unit (36) comprises a magnetic element carrier (37), on which a respective magnetic element (24) of the magnetic elements (24) can be moved relative to the magnetic element carrier (37) in an axial direction and/or in the circumferential direction.

11. The cylinder according to claim 10, characterized in that the respective magnetic element (24) is mounted so as to be movable in the axial and/or circumferential directions relative to the at least one suction element (34), of the plurality of suction elements (34), that is combined with the respective magnetic element (24) and that is provided in a stationary manner at the magnetic element carrier (37) or together with the at least one suction element (34) at the magnetic element carrier (37).

12. The cylinder according to claim 10, characterized in that the respective magnetic element (24) is mounted so as to be movable in the axial and/or circumferential directions between two of the at least one suction elements (34) that are combined with the respective magnetic element (24) and that are provided in a stationary manner at the magnetic element carrier (37) or together with the two at least one suction elements (34) at the magnetic element carrier (37).

13. A machine (01) for generating optically variable image elements (03) on a substrate (02), comprising a substrate infeed (13), at least one printing mechanism (04), by which the substrate (02) guided on a transport path through the machine (01) is and/or can be printed at least on a first side in a matrix-like manner with multiple-ups (09) having a number m of columns and a number n of rows, a product receiving system (22), by which processed substrate (02) can be combined into bundles, as well as at least one alignment device (07) provided in the substrate path between the printing mechanism (04) and the product receiving system (22) for aligning magnetic or magnetizable particles (P), characterized by the at least one alignment device (07) including a cylinder (26) configured according to claim 1.

14. The machine according to claim 13, characterized in that the printing mechanism (04) and the alignment device (07) or at least one impression cylinder (17) forming a printing nip (11) with a printing mechanism cylinder (14) of the printing mechanism (04) and a plurality of the cylinders (26) carrying the magnetic elements (24) are structurally combined in a device (16) for generating optically variable image elements (03) and/or are configured together as a module and/or are mounted at a same frame.

* * * * *